US010261327B2

(12) United States Patent
Nishizawa

(10) Patent No.: US 10,261,327 B2
(45) Date of Patent: Apr. 16, 2019

(54) HEAD MOUNTED DISPLAY AND CONTROL METHOD FOR HEAD MOUNTED DISPLAY

(71) Applicant: SEIKO EPSON CORPORATION, Tokyo (JP)

(72) Inventor: Kazuo Nishizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/875,654

(22) Filed: Jan. 19, 2018

(65) Prior Publication Data

US 2018/0217379 A1 Aug. 2, 2018

(30) Foreign Application Priority Data

Jan. 31, 2017 (JP) ................. 2017-015488

(51) Int. Cl.
| | |
|---|---|
| *G02B 27/01* | (2006.01) |
| *G06F 3/16* | (2006.01) |
| *G06F 3/041* | (2006.01) |
| *G06F 1/16* | (2006.01) |
| *G06F 3/01* | (2006.01) |
| *G06F 3/0488* | (2013.01) |
| *G06F 3/038* | (2013.01) |

(52) U.S. Cl.
CPC ....... *G02B 27/0172* (2013.01); *G02B 27/017* (2013.01); *G06F 1/163* (2013.01); *G06F 3/011* (2013.01); *G06F 3/0414* (2013.01); *G06F 3/0416* (2013.01); *G06F 3/04883* (2013.01); *G06F 3/167* (2013.01); *G02B 2027/0178* (2013.01); *G06F 3/038* (2013.01); *G06F 2203/04104* (2013.01); *G06F 2203/04808* (2013.01)

(58) Field of Classification Search
CPC ........ G02B 2027/0178; G02B 27/0172; G02B 27/017; G06F 1/163; G06F 2203/04104; G06F 2203/04808; G06F 3/011; G06F 3/038; G06F 3/0414; G06F 3/0416; G06F 3/04883; G06F 3/167
See application file for complete search history.

(56) References Cited

U.S. PATENT DOCUMENTS

| | | | | |
|---|---|---|---|---|
| 10,120,566 | B2* | 11/2018 | Fleizach | G06F 3/033 |
| 2013/0127980 | A1* | 5/2013 | Haddick | G06F 3/013 |
| | | | | 348/14.08 |
| 2015/0309316 | A1* | 10/2015 | Osterhout | G06F 3/012 |
| | | | | 345/8 |
| 2016/0314759 | A1* | 10/2016 | Shin | G06F 3/0488 |
| 2017/0322622 | A1* | 11/2017 | Hong | G06F 3/012 |
| 2017/0358144 | A1* | 12/2017 | Schwarz | G06F 3/013 |
| 2018/0136465 | A1* | 5/2018 | Chi | G02B 27/017 |

FOREIGN PATENT DOCUMENTS

JP 2011-034451 A 2/2011

* cited by examiner

*Primary Examiner* — Dmitriy Bolotin
(74) *Attorney, Agent, or Firm* — Oliff PLC

(57) ABSTRACT

A head mounted display includes a control section that switches between a single-touch mode and a multi-touch mode in a case where an operation in a preset aspect is detected, and, in the multi-touch mode, in a case where a pseudo-pointer is moved to a corresponding position outside a display region of an image display section according to an operation on an operation surface, the control section changes a display aspect of the pseudo-pointer.

15 Claims, 21 Drawing Sheets

HEAD MOUNTED DISPLAY AND CONTROL METHOD FOR HEAD MOUNTED DISPLAY

BACKGROUND

1. Technical Field

The present invention relates to a head mounted display, and a control method for the head mounted display.

2. Related Art

In the related art, there is an apparatus which includes an operation surface and a detection section detecting an operation position where a touch operation is performed on the operation surface, and performs a process corresponding to the operation position detected by the detection section. In this apparatus, a more complex operation can be input, and thus a multi-touch operation can be detected. The multi-touch operation is an operation performed while a plurality of fingers are touched on an operation surface.

However, in the multi-touch operation, a plurality of fingers are touched on the operation surface, and an operation cannot be performed with a single hand in a case where the operation performed in a state of holding the operation surface with the hand. Therefore, an apparatus has also been proposed in which multi-touch is possible through an operation using a single finger (for example, refer to JP-A-2011-34451).

The apparatus disclosed in JP-A-2011-34451 outputs a position touched by a user and a pseudo position indicating a position which is symmetric to the position as input data for multi-touch.

However, in a head mounted display used in a state of being mounted on a user's head, an operation surface is required to be disposed within a visual field range via an image display section, and thus there is a problem in operability of a touch operation using the operation surface.

SUMMARY

An advantage of some aspects of the invention is to improve the operability of a touch operation using an operation surface in a head mounted display.

An aspect of the invention is directed to a head mounted display including a head mounted type display section that is mounted on the head of a user; an operation unit that is provided with an operation surface; a detection section that detects an operation; and a control section that is configured to execute a single-operation mode in which a first object which is an operation target is displayed on the display section, and a display position of the first object is changed according to an operation on the operation surface, and a multi-operation mode in which the first object and a second object are displayed on the display section, and display positions of the first object and the second object are changed according to an operation on the operation surface, and switches between the single-operation mode and the multi-operation mode in a case where an operation in a preset aspect is detected by the detection section, in which, in the multi-operation mode, in a case where the second object is moved to a corresponding position outside a display region of the display section according to an operation on the operation surface, the control section changes a display aspect of the second object.

According to the aspect of the invention, it is possible to perform switching between the single-operation mode in which a display position of the first object is changed according to an operation on the operation surface and the multi-operation mode in which display positions of the first object and the second object are changed according to an operation on the operation surface.

In a case where the second object is moved to a corresponding position outside the display region of the display section, a display aspect of the second object is changed, and thus a user can recognize that a display position of the second object is deviated from the display region. Thus, the user can return the first object and the second object to display positions at which an operation can be performed. Thus, in the head mounted display, it is possible to improve the operability of a touch operation using the operation surface.

In the aspect of the invention, in the multi-operation mode, the control section may set a coordinate management region for managing display positions of the first object and the second object, and change coordinates indicating display positions of the first object and the second object in the coordinate management region according to an operation on the operation surface, and the coordinate management region may have a size larger than a size of the display region.

According to the aspect of the invention with this configuration, it is possible to manage display positions of the first object and the second object as coordinates on the coordinate management region. Since a size of the coordinate management region is larger than a size of the display region, even in a case where the first object or the second object is located outside the display region, a coordinate of this object can be managed.

In the aspect of the invention, in a case where an operation mode is changed to the multi-operation mode, the control section may display an auxiliary image indicating an operation position of an operation on the operation surface.

According to the aspect of the invention with this configuration, in a case where an operation mode is changed to the multi-operation mode, the auxiliary image indicating an operation position of an operation on the operation surface is displayed. Thus, in the head mounted display including the head mounted type display section mounted on the head of a user, it is possible to improve the operability of a touch operation using the operation surface.

In the aspect of the invention, in a case where the operation position of an operation on the operation surface is located in a preset region of the operation surface, the control section may display the auxiliary image.

According to the aspect of the invention with this configuration, the auxiliary image can be displayed in a case where an operation position is located in a preset region of the operation surface. For example, in a case where an operation position is an end part of the operation surface, the auxiliary image is displayed, and thus it is possible to prevent an operation from being deviated from the operation surface.

In the aspect of the invention, the detection section may detect movement of the display section, and, in a case where preset movement of the display section is detected by the detection section, the control section may determine that an operation in a preset aspect is detected, and change an operation mode from the single-operation mode to the multi-operation mode.

According to the aspect of the invention with this configuration, if a user moves the head thereof, movement of the display section mounted on the head is detected, and thus it is possible to change an operation mode from the single-operation mode to the multi-operation mode.

In the aspect of the invention, the head mounted display may further include an imaging section that captures an image in a range including external scenery visually recognized through the display section, and, in a case where an image of the operation unit provided with the operation surface is included in an image captured by the imaging section, the control section may determine that an operation in a preset aspect is detected, and change an operation mode from the single-operation mode to the multi-operation mode.

According to the aspect of the invention with this configuration, the operation unit is moved so that the imaging section captures an image of the operation unit, and thus it is possible to change an operation mode from the single-operation mode to the multi-operation mode.

In the aspect of the invention, the operation unit may include a button for switching between the single-operation mode and the multi-operation mode, and, in a case where a pressing operation on the button is detected, the control section may determine that an operation in a preset aspect is detected, and change an operation mode from the single-operation mode to the multi-operation mode.

According to the aspect of the invention with this configuration, it is possible to change an operation mode from the single-operation mode to the multi-operation mode through an operation on the button.

In the aspect of the invention, preferably, the control section may set an operation mode to the multi-operation mode while the pressing operation on the button is continuously detected, and change an operation mode to the single-operation mode in a case where the pressing operation on the button is not detected.

According to the aspect of the invention with this configuration, an operation mode can be changed to the multi-operation mode by continuously performing a pressing operation on the button, and an operation mode can be changed to the single-operation mode by canceling the pressing operation on the button.

In the aspect of the invention, in the multi-operation mode, the control section may display the second object at a display position opposite to the first object with a set position which is set on the basis of an operation in a preset aspect interposed therebetween.

According to the aspect of the invention with this configuration, it is possible to operate the first object and the second object displayed at opposite positions with the set position interposed therebetween on the basis of an operation on the operation surface. Thus, changes of display positions of the first object and the second object are correlated with operations such as rotation, enlargement, reduction, and parallel movement, and thus such operations can be performed through an operation on the operation surface.

In the aspect of the invention, in the multi-operation mode, the control section may switch between a first aspect in which the second object is displayed at a position which is point symmetric to the first object with the set position as the symmetric center, and a second aspect in which the second object is displayed at a position which is linearly symmetric to the first object with the set position as a symmetric axis.

According to the aspect of the invention with this configuration, it is possible to change display positions of the first object and the second object displayed at point symmetric positions or linearly symmetric positions on the basis of an operation on the operation surface. Thus, changes of display positions of the first object and the second object are correlated with operations such as rotation, enlargement, reduction, and parallel movement, and thus such operations can be performed through an operation on the operation surface.

In the aspect of the invention, the detection section may measure a touch area or pressing force on the operation surface in a case where a touch operation on the operation surface is performed, and the control section may select one of the first aspect and the second aspect on the basis of at least one of the touch area and the pressing force measured by the detection section.

According to the aspect of the invention with this configuration, it is possible to select the first aspect and the second aspect by changing a touch area or pressing force in a touch operation.

In the aspect of the invention, in the multi-operation mode, the control section may change a display position of the first object according to an operation on the operation surface, and change a display position of the second object according to a change of the display position of the first object.

According to the aspect of the invention with this configuration, a display position of the second object is changed according to a change of a display position of the first object. Thus, it is also possible to change a display position of the second object by changing a display position of the first object through an operation on the operation surface.

In the aspect of the invention, in the multi-operation mode, in a case where continuous positions on the operation surface are indicated by a single indicator, the control section may change display positions of the first object and the second object.

According to the aspect of the invention with this configuration, it is possible to change display positions of the first object and the second object through an operation of a single indicator.

In the aspect of the invention, in the multi-operation mode, the control section may perform a process corresponding to changes of display positions of the first object and the second object.

According to the aspect of the invention with this configuration, it is possible to perform a process corresponding to changes of display positions of the first object and the second object through an operation on the operation surface.

Another aspect of the invention is directed to a control method for a head mounted display including a head mounted type display section mounted on the head of a user, an operation unit provided with an operation surface, and a detection section detecting an operation, the method including executing a single-operation mode in which a first object which is an operation target is displayed on the display section, and a display position of the first object is changed according to an operation on the operation surface, and a multi-operation mode in which the first object and a second object are displayed on the display section, and display positions of the first object and the second object are changed according to an operation on the operation surface, and switching between the single-operation mode and the multi-operation mode in a case where an operation in a preset aspect is detected by the detection section; and erasing display of the second object from a display region, in the multi-operation mode, in a case where the second object is moved to a corresponding position outside the display region of the display section according to an operation on the operation surface.

According to the aspect of the invention, it is possible to perform switching between the single-operation mode in which a display position of the first object is changed according to an operation on the operation surface and the multi-operation mode in which display positions of the first object and the second object are changed according to an operation on the operation surface.

In a case where the second object is moved to a corresponding position outside the display region of the display section, display of the second object is erased from a display region, and thus a user can recognize that a display position of the second object is deviated from the display region. Thus, the user can return the first object and the second object to display positions at which an operation can be performed. Thus, in the head mounted display, it is possible to improve the operability of a touch operation using the operation surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
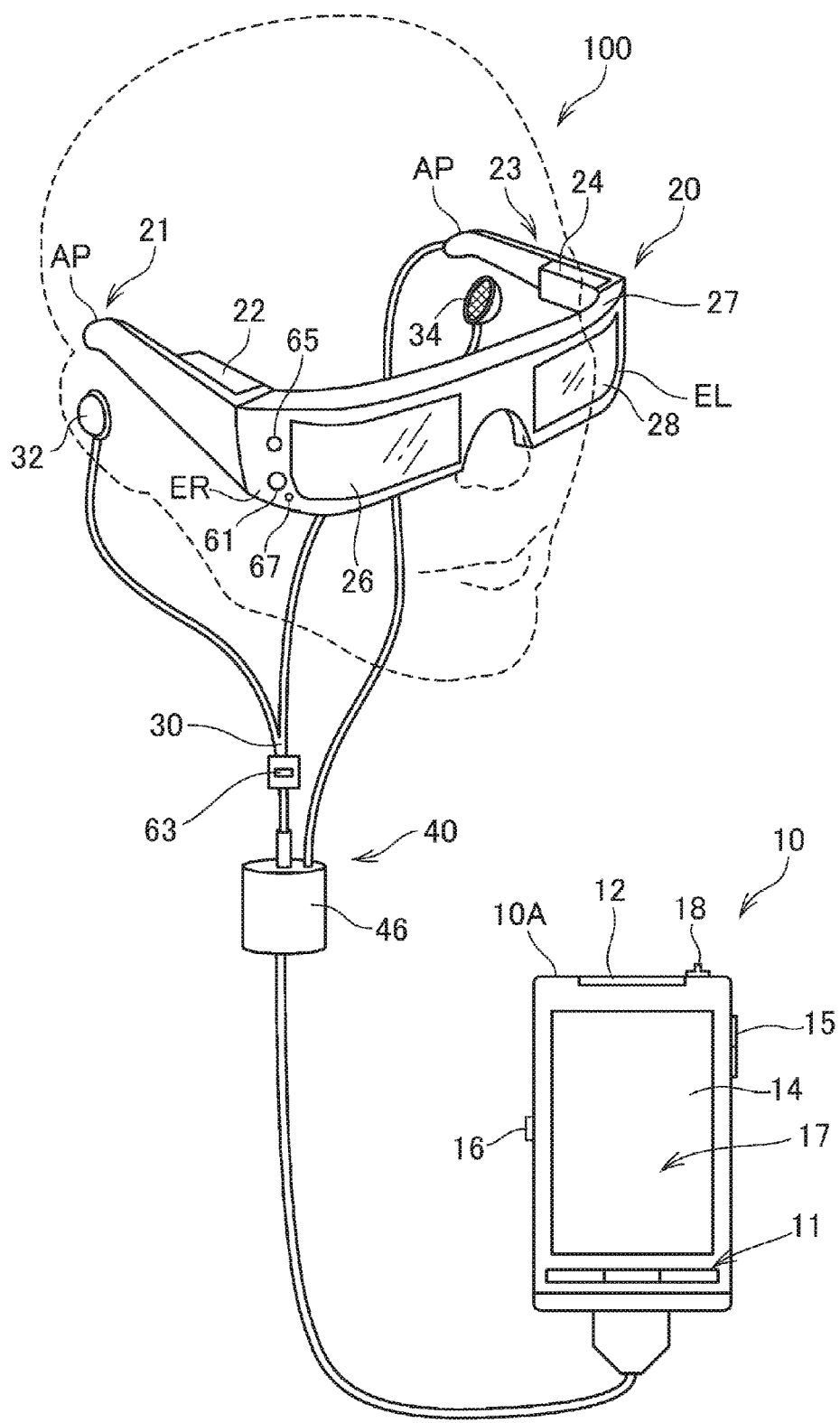
FIG. 1 is an exterior diagram of an HMD.

FIG. 1 is an exterior diagram illustrating an exterior configuration of a head mounted display (HMD) 100 to which the invention is applied.

The HMD 100 is a display apparatus which is mounted on the head of a user, and includes an image display section 20 (display section) which enables a user to visually recognize a virtual image, and a control device 10 which controls the image display section 20.

A person mounting the image display section 20 on the head thereof is referred to as a user. The image display section 20 corresponds to a "display section" according to the invention.

Figure 4:
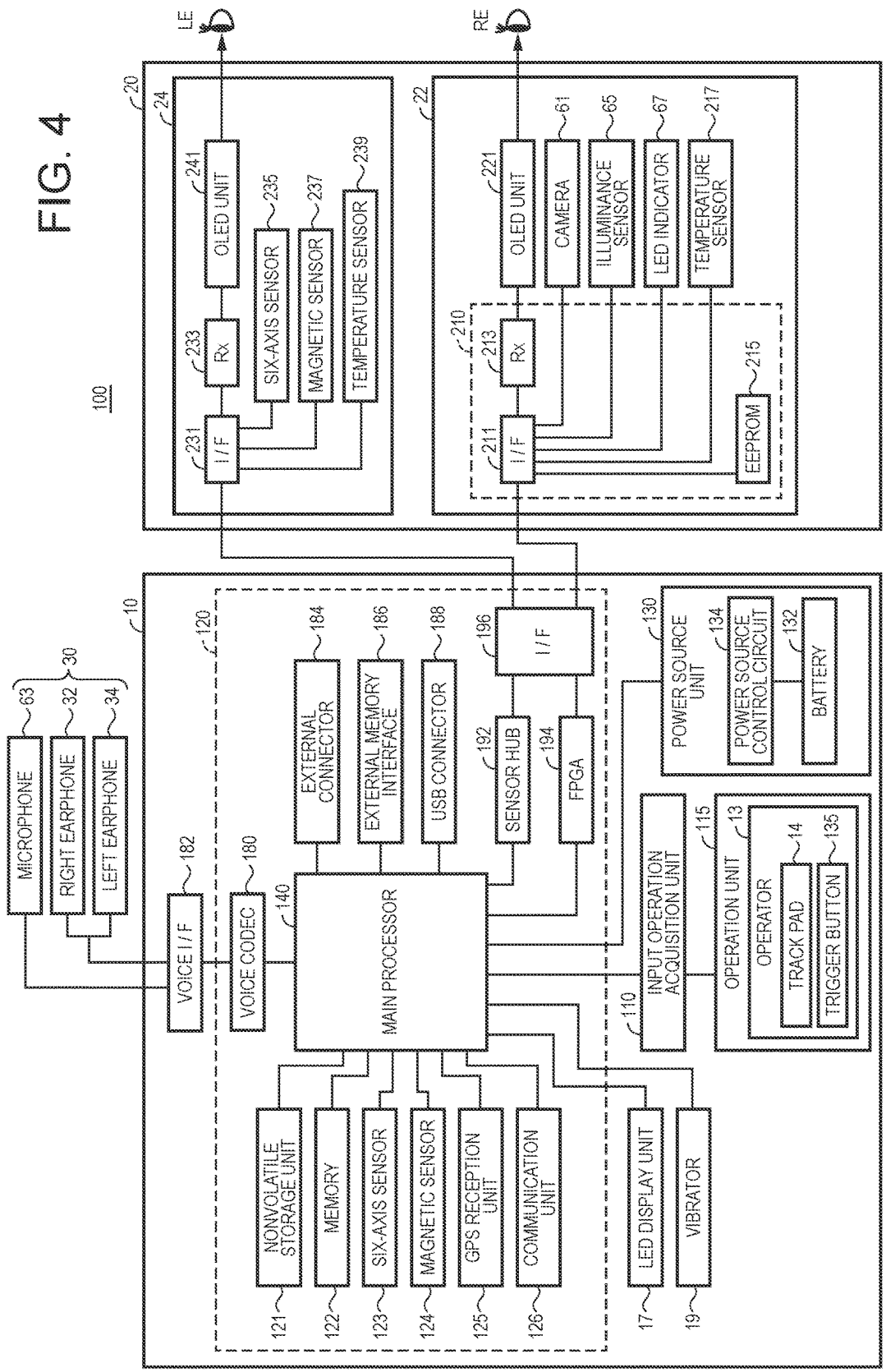
FIG. 4 is a block diagram of the HMD.

The control device 10 includes a flat box-shaped case 10A (which may be said to be a casing or a main body) as illustrated in FIG. 1. The case 10A is provided with respective portions such as operation buttons 11, an LED indicator 12, a track pad 14, up and down keys 15, a switching switch 16, and a power switch 18. The operation button 11, the track pad 14, the up and down keys 15, the switching switch 16, and the power switch 18 are collectively referred to as operators 13 (FIG. 4). The LED indicator 12 functions as a sub-display section indicating an operation state of the HMD 100. The user may operate the HMD 100 by operating the operators 13. The control device 10 functions as a controller of the HMD 100.

The image display section 20 is a mounting body which is mounted on the head of the user, and has a spectacle shape in the present embodiment. The image display section 20 includes a right display unit 22, a left display unit 24, a right light guide plate 26, and a left light guide plate 28 on a main body having a right holding unit 21, a left holding unit 23, and a front frame 27.

The right holding unit 21 and the left holding unit 23 extend backward from both end parts of the front frame 27, and hold the image display section 20 on the head of the user as temples of spectacles. Here, of both ends of the front frame 27, an end part located on the right side of the user in a state in which the image display section 20 is mounted will be referred to as an end part ER, and an end part located on the left side of the user will be referred to as an end part EL. The right holding unit 21 is provided to extend to a position corresponding to the right head of the user from the end part ER of the front frame 27 in a state in which the image display section 20 is mounted. The left holding unit 23 is provided to extend to a position corresponding to the left head of the user from the end part EL of the front frame 27 in a state in which the image display section 20 is mounted.

The right light guide plate 26 and the left light guide plate 28 are provided in the front frame 27. The right light guide plate 26 is located in front of the right eye of the user in a state in which the image display section 20 is mounted, and allows the user to recognize an image with the right eye. The left light guide plate 28 is located in front of the left eye of the user in a state in which the image display section 20 is mounted, and allows the user to recognize an image with the left eye.

The front frame 27 has a shape connecting one end of the right light guide plate 26 to one end of the left light guide plate 28, and a connection position corresponds to the glabellar of the user when the user wears the image display section 20. The front frame 27 may be provided with a nose contact part which is in contact with the nose of the user at the connection position between the right light guide plate 26 and the left light guide plate 28 in a state in which the image display section 20 is mounted. In this case, the image display section 20 can be held on the head of the user by the nose contact part, the right holding unit 21, and the left holding unit 23. A belt (not illustrated) coming into contact with the back of the head of the user in a state in which the image display section 20 is mounted may be provided at the right holding unit 21 and the left holding unit 23, and, in this case, the image display section 20 can be held on the head of the user by the belt.

The right display unit 22 displays an image by using the right light guide plate 26. The right display unit 22 is provided at the right holding unit 21, and is located near the right temporal region of the user in a mounting state. The left display unit 24 displays an image by using the left light guide plate 28. The left display unit 24 is provided at the left holding unit 23, and is located near the left temporal region of the user in a mounting state.

The right light guide plate 26 and the left light guide plate 28 are an optical unit made of a light transmissive resin material or the like, and are, for example, prisms, and guide image light which is output from the right display unit 22 and the left display unit 24 to the eyes of the user.

Dimming plates (not illustrated) may be provided on surfaces of the right light guide plate 26 and the left light guide plate 28. The dimming plates are optical elements on thin plates differing in transmittance depending on a wavelength region of light, and function as so-called wavelength filters. The dimming plates are disposed to cover the surface of the front frame 27 on an opposite side to the eye sides of the user. Optical characteristics of the dimming plates are selected as appropriate so that transmittance of light in any wavelength region such as visible light, infrared light, and ultraviolet light can be adjusted, and thus it is possible to adjust an amount of external light which is incident to the right light guide plate 26 and the left light guide plate 28 from the outside and is transmitted through the right light guide plate 26 and the left light guide plate 28.

The image display section 20 guides image light beams generated by the right display unit 22 and the left display unit 24 to the right light guide plate 26 and the left light guide plate 28, respectively. The image light beams guided to the right light guide plate 26 and the left light guide plate 28 are incident to the right eye and the left eye of the user, and thus the user visually recognizes a virtual image. Consequently, the image display section 20 displays an image.

In a case where external light is transmitted through the right light guide plate 26 and the left light guide plate 28 from the front side of the user so as to be incident to the eyes of the user, image light forming a virtual image and the external light are incident to the eyes of the user, and thus visibility of a virtual image is influenced by the intensity of the external light. Thus, for example, dimming plates are provided to the front frame 27, and optical characteristics of the dimming plates are selected or adjusted as appropriate so that case of visibility of a virtual image can be adjusted. In a typical example, there may be use of dimming plates having light transmittance to the extent to which the user wearing the HMD 100 can visually recognize at least external scenery. If the dimming plates are used, it is possible to expect an effect of protecting the right light guide plate 26 and the left light guide plate 28 so as to prevent damage of the right light guide plate 26 and the left light guide plate 28 and adhesion of dirt. The dimming plates may be attachable and detachable to and from the front frame 27 or the right light guide plate 26 and the left light guide plate 28, a plurality of kinds of dimming plates may be attached in a replaceable manner, and the dimming plates may be omitted.

A camera 61 is disposed at the front frame 27 of the image display section 20. A configuration and arrangement of the camera 61 are determined so that an image is captured in a direction of external scenery visually recognized in a state in which the user wears the image display section 20. For example, the camera 61 is provided at a position where external light transmitted through the right light guide plate 26 and the left light guide plate 28 is not blocked on the front surface of the front frame 27. In the example illustrated in FIG. 1, the camera 61 is disposed on the end part ER side of the front frame 27, but the camera 61 may be disposed on the end part EL side, and may be disposed at the connection part between the right light guide plate 26 and the left light guide plate 28. The camera 61 corresponds to an "imaging section" according to the invention.

The camera 61 is a digital camera including an imaging element such as a CCD or a CMOS, and an imaging lens. The camera 61 of the present embodiment is a monocular camera, but may be stereo camera. The camera 61 captures images of at least a part of external scenery (real space) in a surface side direction of the HMD 100, that is, in a visual field direction of the user in a state in which the HMD 100 is mounted. In another expression, the camera 61 captures an image in a range or a direction overlapping the visual field of the user, and captures an image in a gazing direction of the user. A direction and a width of an angle of view of the camera 61 may be set as appropriate. In the present embodiment, as will be described later, an angle of view of the camera 61 covers an external world visually recognized by the user through the right light guide plate 26 and the left light guide plate 28. More preferably, an angle of view of the camera 61 is set so that the entire visual field of the user which can be visually recognized through the right light guide plate 26 and the left light guide plate 28 can be imaged.

Figure 5:
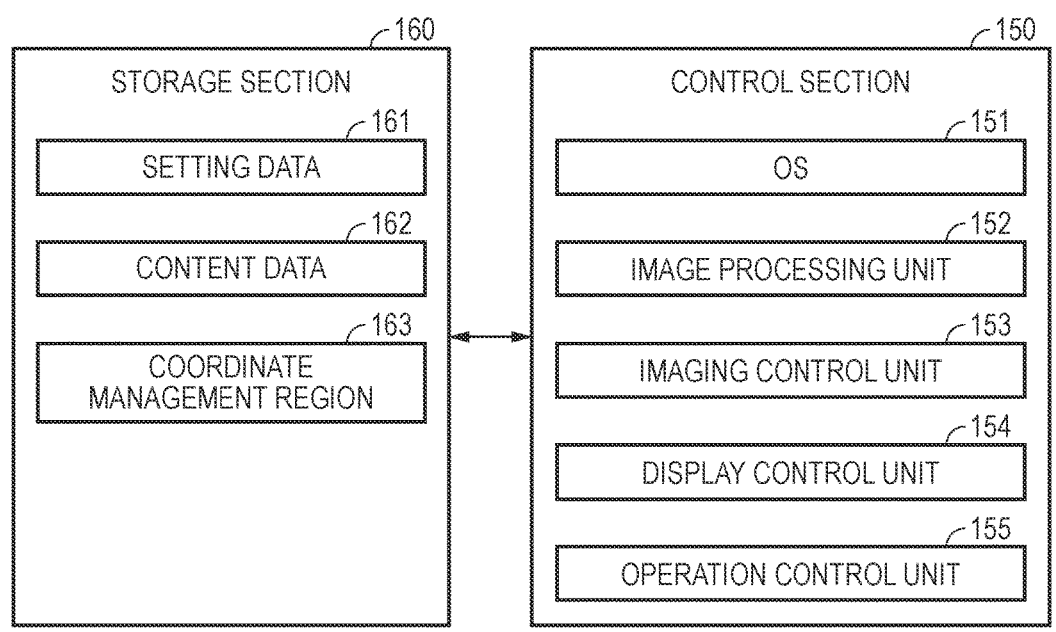
FIG. 5 is a functional block diagram of a control device.

The camera 61 performs imaging under the control of an imaging control unit 153 provided in a control section 150 (FIG. 5). The camera 61 outputs captured image data to the control section 150 via an interface 211 which will be described later.

The HMD 100 may be provided with a distance sensor (not illustrated) detecting a distance to a measurement target object located in a preset measurement direction. The distance sensor may be disposed, for example, at the connection part between the right light guide plate 26 and the left light guide plate 28 in the front frame 27. In this case, in a state in which the image display section 20 is mounted, a position of the distance sensor is substantially the center of both eyes of the user in the horizontal direction, and is located above both eyes of the user in the vertical direction. A measurement direction of the distance sensor may be, for example, a surface side direction of the front frame 27, and is, in other words, a direction overlapping an imaging direction of the camera 61. The distance sensor may be configured to include a light source such as an LED or a laser diode, and a light receiving portion receiving light which is emitted from the light source and is reflected at a measurement target object. The distance sensor may perform a triangulation ranging process, or a ranging process based on a time difference under the control of the control section 150. The distance sensor may be configured to include a sound source emitting an ultrasonic wave, and a detection portion receiving an ultrasonic wave reflected at a measurement target object. In this case, the distance sensor may perform a ranging process on the basis of a time difference to reflection of an ultrasonic wave under the control of the control section 150.

Figure 2:
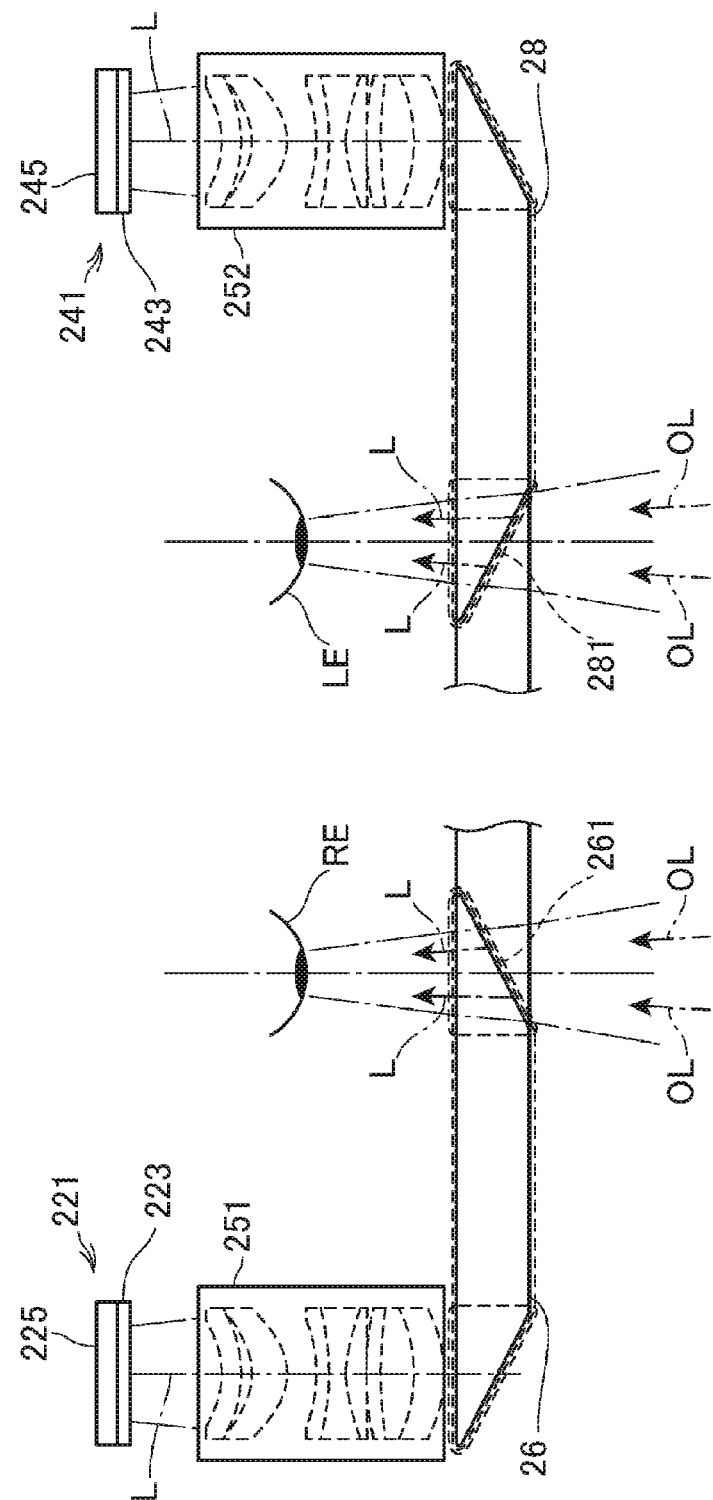
FIG. 2 is a main portion plan view illustrating a configuration of an optical system of the HMD.

FIG. 2 is a main portion plan view illustrating a configuration of an optical system included in the image display section 20. For description, FIG. 2 illustrates the left eye LE and the right eye RE of the user.

As illustrated in FIG. 2, the right display unit 22 and the left display unit 24 are configured to be horizontally symmetric to each other. The right display unit 22 includes an organic light emitting diode (OLED) unit 221 emitting image light and a right optical system 251 having a lens group guiding image light L emitted from the OLED unit 221, as a configuration of causing the user to visually recognize an image with the right eye RE. The image light L is guided to the right light guide plate 26 by the right optical system 251.

The OLED unit 221 includes an OLED panel 223 and an OLED drive circuit 225 driving the OLED panel 223. The OLED panel 223 is a self-emissive display panel having a configuration in which light emitting elements emitting color light beams of red (R), green (G), and blue (B) through organic electroluminescence are disposed in a matrix. The OLED panel 223 includes a plurality of pixels with a unit including each of elements of R, G, and B as a single pixel, and forms an image by using the pixels disposed in a matrix. The OLED drive circuit 225 selects the light emitting elements of the OLED panel 223 and causes currents to flow through the light emitting elements under the control of the control section 150 (FIG. 5), and thus the light emitting elements of the OLED panel 223 emit light. The OLED drive circuit 225 is fixed to a rear surface of the OLED panel 223, that is, a rear side of a light emission surface, through bonding or the like. The OLED drive circuit 225 is formed of, for example, a semiconductor device driving the OLED panel 223, and may be mounted on a board (not illustrated) fixed to the rear surface of the OLED panel 223. A temperature sensor 217 is mounted on the board.

The OLED panel 223 may have a configuration in which light emitting elements emitting white light are disposed in a matrix, and color filters corresponding to colors of R, G, and B are disposed to overlap the light emitting elements. There may be use of the OLED panel 223 having a WRGB configuration in which light emitting elements emitting white (W) light are provided in addition to light emitting elements emitting color light beams of R, G, and B.

The right optical system 251 includes a collimator lens which converts the image light L emitted from the OLED panel 223 into a light beam in a parallel state. The image light L which is converted into the light beam in a parallel state by the collimator lens is incident to the right light guide plate 26. A plurality of reflection surfaces reflecting the image light L are formed on an optical path through which the light is guided inside the right light guide plate 26. The image light L is guided to the right eye RE side through a plurality of times of reflection inside the right light guide plate 26. A half mirror 261 (reflection surface) located in front of the right eye RE is formed in the right light guide plate 26. The image light L is reflected at the half mirror 261 so as to be emitted toward the right eye RE from the right light guide plate 26, and the image light L forms an image on the retina of the right eye RE so that the user visually recognizes the image.

The left display unit 24 includes an organic light emitting diode (OLED) unit 241 emitting image light and a left optical system 252 having a lens group guiding image light L emitted from the OLED unit 241, as a configuration of causing the user to visually recognize an image with the left eye LE. The image light L is guided to the left light guide plate 28 by the left optical system 252.

The OLED unit 241 includes an OLED panel 243 and an OLED drive circuit 245 driving the OLED panel 243. The OLED panel 243 is a self emissive display panel having the same configuration as that of the OLED panel 223. The OLED drive circuit 245 selects the light emitting elements of the OLED panel 243 and causes currents to flow through the light emitting elements under the control of the control section 150 (FIG. 5), and thus the light emitting elements of the OLED panel 243 emit light. The OLED drive circuit 245 is fixed to a rear surface of the OLED panel 243, that is, a rear side of a light emission surface, through bonding or the like. The OLED drive circuit 245 is formed of, for example, a semiconductor device driving the OLED panel 243, and may be mounted on a board (not illustrated) fixed to the rear surface of the OLED panel 243. A temperature sensor 239 is mounted on the board.

The left optical system 252 includes a collimator lens which converts the image light L emitted from the OLED panel 243 into a light beam in a parallel state. The image light L which is converted into the light beam in a parallel state by the collimator lens is incident to the left light guide plate 28. The left light guide plate 28 is an optical element in which a plurality of reflection surfaces reflecting the image light L are formed, and for example, a prism. The image light L is guided to the left eye LE side through a plurality of times of reflection inside the left light guide plate 28. A half mirror 281 (reflection surface) located in front of the left eye LE is formed in the left light guide plate 28. The image light L is reflected at the half mirror 281 so as to be emitted toward the left eye LE from the left light guide plate 28, and the image light L forms an image on the retina of the left eye LE so that the user visually recognizes the image.

According to this configuration, the HMD 100 functions as a see-through type display apparatus. In other words, the image light L reflected at the half mirror 261 and external light OL transmitted through the half mirror 261 are incident to the right eye RE of the user. The image light L reflected at the half mirror 281 and external light OL transmitted through the half mirror 281 are incident to the left eye LE. As mentioned above, in the HMD 100, the image light L for an image processed therein and the external light OL are incident to the eyes of the user in an overlapping manner, and the user views external scenery through the right light guide plate 26 and the left light guide plate 28, and visually recognizes an image based on the image light L in an overlapping manner with the external scenery.

The half mirrors 261 and 281 are image extraction units extracting images by reflecting image light beams output from the right display unit 22 and the left display unit 24, and may be said to be display sections.

The left optical system 252 and the left light guide plate 28 will be collectively referred to as a "left light guide portion", and the right optical system 251 and the right light guide plate 26 will be collectively referred to as a "right light guide portion". Configurations of the right light guide portion and the left light guide portion are not limited to the above-described example, any type may be used as long as a virtual image is formed in front of the eyes of the user by using image light, for example, a diffraction grating may be used, and a transflective film may be used.

Referring to FIG. 1 again, the control device 10 and the image display section 20 are connected to each other via a connection cable 40. The connection cable 40 is attachably and detachably connected to a connector (not illustrated) provided on a lower part of the case 10A, and is connected to various circuits provided in the image display section 20 from a tip of the left holding unit 23. The connection cable 40 is provided with a metal cable or an optical fiber cable through which digital data is transmitted, and may be provided with a metal cable through which an analog signal is transmitted. A connector 46 is provided in the middle of the connection cable 40. The connector 46 is a jack for connection to a stereo mini plug, and the connector 46 and the control device 10 are connected to each other via, for example, a line through which an analog voice signal is transmitted. In the configuration example illustrated in FIG. 1, a headset 30 including a right earphone 32 and a left earphone 34 forming a stereo headphone, and a microphone 63 is connected to the connector 46.

The control device 10 and the image display section 20 may be connected to each other in a wireless manner. For example, there may be a configuration in which the control device 10 and the image display section 20 transmit and receive control signals or data to and from each other through wireless communication based on standards such as Bluetooth (registered trademark) or a wireless LAN (including Wi-Fi (registered trademark)).

For example, as illustrated in FIG. 1, in the microphone 63, a voice collecting portion of the microphone 63 is disposed to be directed in a visual line direction of the user, collects voices, and outputs a voice signal to a voice interface 182 (FIG. 4). The microphone 63 may be, for example, a monaural microphone, may be a stereo microphone, may be a directional microphone, and may be a non-directional microphone.

Next, a description will be made of the operators 13 of the control device 10.

The operation buttons 11 are provided with keys or switches for operating the control device 10, and the keys or the switches are displaced through a pressing operation. For example, the operation buttons 11 include a menu key, a home key, and a "back" key for performing operations regarding an operating system (hereinafter, abbreviated to an OS) 151 (FIG. 5) executed by the control device 10.

The LED indicator 12 is lighted or blinks depending on an operation state of the HMD 100. The up and down keys 15 are used to input an instruction for changing volumes output from the right earphone 32 and the left earphone 34, or to input an instruction for changing brightness of display of the image display section 20. The switching switch 16 is a switch for switching between inputs corresponding to operations of the up and down keys 15. The power switch 18 is a switch for switching between ON and OFF of power of the HMD 100, and is, for example, a slide switch.

The track pad 14 has an operation surface 14a (FIGS. 7 to 14), and detects an operation on the operation surface 14a. Details of the track pad 14 will be described with reference to FIG. 4. The track pad 14 is provided with an LED display unit 17. The LED display unit 17 includes a plurality of LEDs, and light from each of the LEDs is transmitted through the track pad 14 so as to display an operation icon or the like. The icon or the like functions as a software button.

Figure 3:
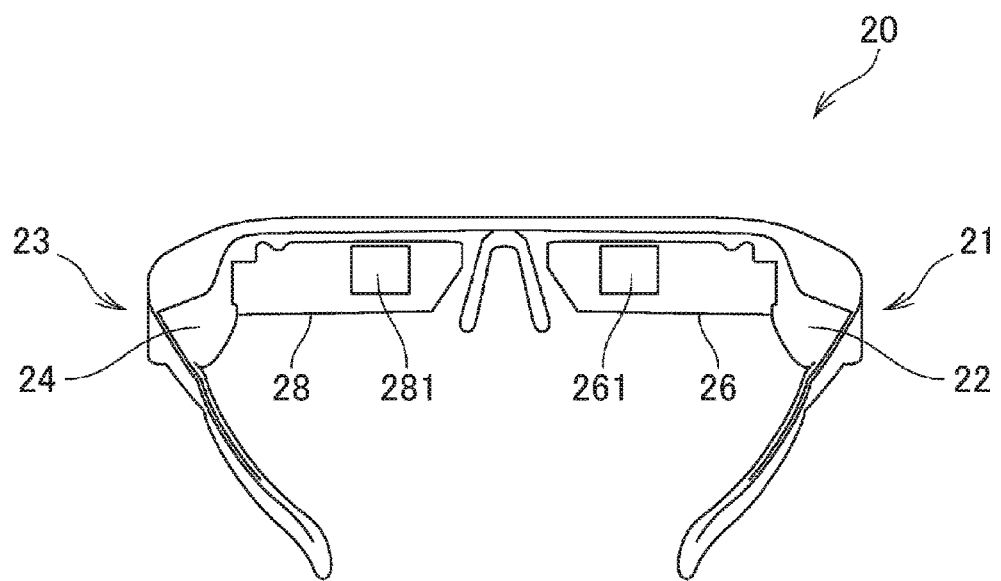
FIG. 3 is a perspective view illustrating a configuration of an image display section.

FIG. 3 is a perspective view illustrating a configuration of the image display section 20, and illustrates a main portion configuration in which the image display section 20 is viewed from the head side of the user. FIG. 3 illustrates the sides coming into contact with the head of the user of the image display section 20, that is, the sides viewed from the right eye RE and the left eye LE of the user. In other words, rear sides of the right light guide plate 26 and the left light guide plate 28 are viewed.

In FIG. 3, the half mirror 261 irradiating the right eye RE of the user with image light and the half mirror 281 irradiating the left eye LE thereof with image light are viewed as substantially rectangular regions. The whole of the right light guide plate 26 and the left light guide plate 28 including the half mirrors 261 and 281 transmit external light therethrough. Thus, the user visually recognizes external scenery transmitted through the whole of the right light guide plate 26 and the left light guide plate 28, and visually recognizes rectangular display images at the positions of the half mirrors 261 and 281.

The camera 61 is disposed at the right end in the image display section 20, and captures an image in a direction in which both eyes of the user are directed, that is, in a front direction of the user. An optical axis of the camera 61 is set in a direction including visual line directions of the right eye RE and the left eye LE. External scenery which can be visually recognized by the user in a state of wearing the HMD 100 is not limited to infinity. For example, in a case where the user gazes at a target object located on the front side of the user, a distance from the user to the target object is generally about 30 cm to 10 m, and is more generally about 1 m to 4 m. Therefore, criteria of an upper limit and a lower limit of a distance from the user to a target object in normal use may be set for the HMD 100. These criteria may be obtained through research or test, and may be set by the user. An optical axis and an angle of view of the camera 61 are preferably set so that a target object is included in the angle of view in a case where a distance to the target object in normal use corresponds to the set criterion of an upper limit and corresponds to the set criterion of a lower limit.

Generally, a human visual field angle is about 200 degrees in the horizontal direction, and is about 125 degrees in the vertical direction, and an effective visual field at which information accepting performance is excellent is about 30 degrees in the horizontal direction, and is about 20 degrees in the vertical direction. A stable gazing field at which a gazing point gazed at by a human is viewed rapidly stably is about 60 to 90 degrees in the horizontal direction and is about 45 degrees to 70 degrees in the vertical direction. In a case where a gazing point is a target object located on the front side of the user, an effective visual field is about 30 degrees in the horizontal direction, and is about 20 degrees in the vertical direction, centering on a visual line of each of the right eye RE and the left eye LE in a visual field of the user. A stable gazing field is about 60 to 90 degrees in the horizontal direction, and is about 45 to 70 degrees in the vertical direction, and a visual field angle is about 200 degrees in the horizontal direction, and is about 125 degrees in the vertical direction. An actual visual field at which the user visually recognizes a target object through the right light guide plate 26 and the left light guide plate 28 may be referred to as a field of view (FOV). In the configurations of the present embodiment illustrated in FIGS. 1 and 2, an FOV corresponds to an actual visual field at which the user visually recognizes a target object through the right light guide plate 26 and the left light guide plate 28. The FOV is narrower than a visual field angle and a stable gazing field, and is wider than an effective visual field.

An angle of view of the camera 61 is preferably set so that imaging can be performed in a range wider than a visual field of the user, and, specifically, the angle of view is more preferably wider than at least an effective visual field of the user. The angle of view is more preferably wider than an FOV of the user. Furthermore preferably, the angle of view is wider than a stable gazing field of the user, and, most preferably, the angle of view is wider than a visual field angle of both eyes of the user.

There may be a configuration in which the camera 61 includes a so-called wide angle lens as the imaging lens, and imaging can be performed at a wide angle of view. The wide angle lens may include a lens called a superwide angle lens or a semi-wide angle lens, may be a monofocal lens, and may be a zoom lens, and the camera 61 may be configured to include a lens group formed of a plurality of lenses.

FIG. 4 is a block diagram illustrating a configuration of each unit forming the HMD 100.

The control device 10 includes a main processor 140 which executes a program so as to control the HMD 100. The main processor 140 is connected to a memory 122. The main processor 140 is connected to the LED display unit 17, a vibrator 19, and an operation unit 115 via an input operation acquisition unit 110. The main processor 140 is connected to a six-axis sensor 123 and a magnetic sensor 124 as sensors. The main processor 140 is connected to a GPS reception unit 125, a communication unit 126, a voice codec 180, an external connector 184, an external memory interface 186, a USB connector 188, a sensor hub 192, and an FPGA 194. These constituent elements function as interfaces with external devices.

The main processor 140 is mounted on a controller board 120 built into the control device 10. The controller board 120 is further mounted with the memory 122, a nonvolatile storage unit 121, the six-axis sensor 123, the magnetic sensor 124, the GPS reception unit 125, the communication unit 126, and the voice codec 180, in addition to the main processor 140. In the present embodiment, the external connector 184, the external memory interface 186, the USB connector 188, the sensor hub 192, the FPGA 194, and an interface 196 are mounted on the controller board 120.

The memory 122 forms a work area which temporarily stores an executed program and processed data in a case where the main processor 140 executes the program. The nonvolatile storage unit 121 is formed of a flash memory or an embedded Multi Media Card (eMMC). The nonvolatile storage unit 121 stores a program executed by the main processor 140 or various pieces of data processed by the main processor 140 executing the program.

The operation unit 115 includes the operators 13. The operation unit 115 corresponds to a "detection section" according to the invention. The operators 13 include not only the operation buttons 11, the LED indicator 12, the track pad 14, the up and down keys 15, the switching switch 16, and the power switch 18 but also a trigger button 135.

The track pad 14 has the operation surface 14a, and detects a touch operation on the operation surface 14a. The touch operation is an operation in which the tip of the finger of the user is touched to the operation surface 14a, the finger is moved on the operation surface 14a in a state in which the touch state to the operation surface 14a is maintained, and a continuous position on the operation surface 14a is indicated. The touch operation includes an operation of selecting a predetermined position on the operation surface 14a, or an operation performed by moving the fingertip on the operation surface 14a. Hereinafter, the finger of the user touched to the operation surface 14a will be referred to as an operation finger. A touch operation on the operation surface 14a is detected by a touch sensor (not illustrated). A method of the touch sensor detecting a touch operation may employ various methods such as an electrostatic type, a pressure sensitive type, and an optical type. If a touch operation on the operation surface 14a is detected, the track pad 14 outputs information indicating a position on the operation surface 14a where touch is detected, or pressure (hereinafter, referred to as touch pressure) of the operation finger touched to the operation surface 14a, to the input operation acquisition unit 110.

In the present embodiment, the finger of the user is described as an example of an indicator, but an indicator is not limited to the finger of the user, and may be, for example, a digitizer or a stylus.

The operators 13 include the trigger button 135.

The trigger button 135 is a button for switching between operations of a pointer displayed in a display region VR (FIGS. 7 to 14) of the image display section 20. In a case where the trigger button 135 is pressed, a pointer operation based on a multi-touch operation is received, and, in a case where the trigger button 135 is not pressed, a pointer operation based on a single-touch operation is received. The pointer corresponds to an operation target object.

The display region VR is a region in which the image display section 20 displays an object such as an image. The user can visually recognize external scenery visually recognized through the image display section 20 while visually recognizing an object displayed in the display region VR by the image display section 20.

The single-touch operation is an operation mode of operating a pointer with a single finger. The multi-touch operation is an operation mode of operating a pointer by using a plurality of operation fingers, and is an operation performed by touching a plurality of operation fingers at different positions in the operation surface 14a in a temporally overlapping manner. Through the multi-touch operation, for example, it is possible to perform a complex operation such as enlargement, reduction, and rotation of an object such as an image displayed in the display region VR. In the present embodiment, a single-touch operation and a multi-touch operation are realized through a touch operation using a single operation finger. Details of this process will be described later.

In the present embodiment, a pointer operation based on a multi-touch operation can be performed only while a state of pressing the trigger button 135 is continued. In a case where pressing of the trigger button 135 is canceled, that is, the user releases the finger from the trigger button 135, an operation mode of a pointer is changed from a multi-touch operation to a single-touch operation.

In a case where the operator 13 of the operation unit 115 is operated, the input operation acquisition unit 110 outputs identification information of the operated operator 13 and information indicating the received operation content to the control section 150. For example, in a case where the user performs a touch operation of moving the operation finger on the operation surface 14a, the input operation acquisition unit 110 generates information indicating a movement direction or a movement distance of the operation finger moved on the operation surface 14a as information indicating the operation content on the basis of information which is input from the track pad 14. The input operation acquisition unit 110 generates information indicating an area (hereinafter, referred to as a touch area) of the operation finger touched to the operation surface 14a on the basis of the information which is input from the track pad 14.

The input operation acquisition unit 110 outputs information indicating coordinates on the operation surface 14a where the touch is detected, the information indicating the movement direction or the movement distance of the operation finger, the information indicating the touch area or the touch pressure, and the identification information of the operator 13, to the control section 150 as operation information.

The LED display unit 17 controls lighting and unlighting of the LED indicator 12 under the control of the main processor 140. The LED display unit 17 may be configured to include an LED (not illustrated) directly under the track pad 14 and a drive circuit lighting the LED. In this case, the LED display unit 17 causes the LED to perform lighting, blinking, and unlighting under the control of the main processor 140.

The vibrator 19 includes a motor and an eccentric rotor (none illustrated), and may include other necessary constituent elements. The vibrator 19 generates vibration by rotating the motor under the control of the main processor 140. For example, in a case where an operation on the operation unit 115 is detected, in a case where the supply of power to the HMD 100 is turned on or off, or in other cases, the HMD 100 generates vibration with the vibrator 19 in a predetermined vibration pattern.

The six-axis sensor 123 is a motion sensor (inertial sensor) including a three-axis acceleration sensor and a three-axis gyro (angular velocity) sensor. The six-axis sensor 123 may employ an inertial measurement unit (IMU) in which the sensors are modularized.

The magnetic sensor 124 is, for example, a three-axis geomagnetic sensor.

The six-axis sensor 123 and the magnetic sensor 124 output detection values to the main processor 140 according to a sampling cycle designated in advance. The six-axis sensor 123 and the magnetic sensor 124 output the detection values to the main processor 140 at a timing designated by the main processor 140 in response to a request from the main processor 140.

The GPS reception unit 125 includes a GPS antenna (not illustrated), and receives a GPS signal transmitted from a GPS satellite. The GPS reception unit 125 outputs the received GPS signal to the main processor 140. The GPS reception unit 125 measures the strength of the received GPS signal, and outputs the measured strength to the main processor 140. The signal strength may use, for example, information such as a received signal strength indication (RSSI), an electric field strength, a magnetic field strength, or a signal to noise ratio (SNR).

The communication unit 126 performs wireless communication with external apparatuses. The communication unit 126 is configured to include an antenna, RF circuit, a baseband circuit, a communication control circuit, and the like, and is formed of a device into which the constituent elements are integrated. The communication unit 126 performs wireless communication based on standards such as Bluetooth or a wireless LAN (including Wi-Fi).

The voice interface 182 is an interface via which a voice signal is input and output. In the present embodiment, the voice interface 182 includes the connector 46 (FIG. 1) provided at the connection cable 40. The connector 46 is connected to the headset 30. The voice signal output from the voice interface 182 is input to the right earphone 32 and the left earphone 34, and thus the right earphone 32 and the left earphone 34 output voices. The microphone 63 of the headset 30 collects voices, and outputs a voice signal to the voice interface 182. The voice signal which is input to the voice interface 182 from the microphone 63 is input to the external connector 184.

The voice codec 180 is connected to the voice interface 182, and performs encoding and decoding of voice signals which are input and output via the voice interface 182. The voice codec 180 may include an A/D converter performing conversion from an analog voice signal into digital voice data, and a D/A converter performing inverse conversion thereto. For example, in the HMD 100 of the present embodiment, voices are output to the right earphone 32 and the left earphone 34, and the microphone 63 collects voices. The voice codec 180 converts digital voice data output from the main processor 140 into an analog voice signal, and outputs the voice signal via the voice interface 182. The voice codec 180 converts an analog voice signal which is input to the voice interface 182 into digital voice data which is then output to the main processor 140.

The external connector 184 is a connector for connection to external devices performing communication with the main processor 140. For example, in a case where an external device is connected to the main processor 140, and debugs a program executed by the main processor 140 or collects logs of operations of the HMD 100, the external connector 184 is an interface for connection to the external device.

The external memory interface 186 is an interface to which a portable memory device is connectable, and includes, for example, a memory card slot attached with a card type recording medium and capable of reading data, and an interface circuit. In this case, a size, a shape, and a standard of the card type recording medium are not limited, and may be changed as appropriate.

A universal serial bus (USB) connector 188 includes a connector based on a USB standard, and an interface circuit. The USB connector 188 is connectable to a USB memory device, a smart phone, a computer, and the like. A size or a shape of the USB connector 188, and a version of an appropriate USB standard may be selected and changed as appropriate.

The sensor hub 192 and the FPGA 194 are connected to the image display section 20 via an interface (I/F) 196. The sensor hub 192 acquires detection values in various sensors of the image display section 20, and outputs the detection values to the main processor 140. The FPGA 194 performs processing of data which is transmitted and received between the main processor 140 and each unit of the image display section 20, and transmission using the interface 196.

The right display unit 22 and the left display unit 24 of the image display section 20 are connected to the control device 10. As illustrated in FIG. 1, in the HMD 100, the connection cable 40 is connected to the left holding unit 23, a wiring connected to the connection cable 40 is laid in the image display section 20, and thus the right display unit 22 and the left display unit 24 are connected to the control device 10.

The right display unit 22 includes a display unit board 210. The display unit board 210 is provided with an interface (I/F) 211 connected to the interface 196, a reception unit (Rx) 213 which receives data which is input from the control device 10 via the interface 211, and an EEPROM 215.

The interface 211 connects the reception unit 213, the EEPROM 215, a temperature sensor 217, the camera 61, an illuminance sensor 65, and an LED indicator 67 to the control device 10.

The electrically erasable programmable read only memory (EEPROM) 215 stores various pieces of data to be readable by the main processor 140. The EEPROM 215 stores data regarding light emission characteristics or display characteristics of the OLED units 221 and 241 of the image display section 20, data regarding characteristics of sensors provided in the right display unit 22 or the left display unit 24, and the like. Specifically, parameters related to gamma correction of the OLED units 221 and 241, data for compensating for detection values in the temperature sensors 217 and 239, and the like are stored. This data is generated through inspection during factory shipment of the HMD 100, so as to be written into the EEPROM 215, and the main processor 140 performs a process by using the data in the EEPROM 215 after the shipment.

The camera 61 performs imaging in response to a signal which is input via the interface 211, and outputs captured image data or a signal indicating an imaging result to the control device 10.

As illustrated in FIG. 1, the illuminance sensor 65 is provided at the end part ER of the front frame 27, and is disposed to receive external light from the front side of the user wearing the image display section 20. The illuminance sensor 65 outputs a detection value corresponding to a light reception amount (light reception intensity).

As illustrated in FIG. 1, the LED indicator 67 is disposed near the camera 61 at the end part ER of the front frame 27. The LED indicator 67 is lighted during execution of imaging in the camera 61, and performs a notification that imaging is being performed.

The temperature sensor 217 detects a temperature, and outputs a voltage value or a resistance value corresponding to the detected temperature as a detection value. The temperature sensor 217 is mounted on the rear surface side of the OLED panel 223 (FIG. 2). The temperature sensor 217 may be mounted on the same board as, for example, that of the OLED drive circuit 225. With this configuration, the temperature sensor 217 generally detects the temperature of the OLED panel 223.

The reception unit 213 receives data transmitted from the main processor 140 via the interface 211. In a case where image data for an image displayed by the OLED unit 221 is received, the reception unit 213 outputs the received image data to the OLED drive circuit 225 (FIG. 2).

The left display unit 24 includes a display unit board 210. The display unit board 210 is provided with an interface (I/F) 231 connected to the interface 196, and a reception unit (Rx) 233 which receives data which is input from the control device 10 via the interface 231. The display unit board 210 is mounted with a six-axis sensor 235 and a magnetic sensor 237.

The interface 231 connects the reception unit 233, the six-axis sensor 235, the magnetic sensor 237, and the temperature sensor 239 to the control device 10. The six-axis sensor 235 corresponds to a "detection section" according to the invention.

The six-axis sensor 235 is a motion sensor (inertial sensor) including a three-axis acceleration sensor and a three-axis gyro (angular velocity) sensor. The six-axis sensor 235 may employ an IMU in which the sensors are modularized.

The magnetic sensor 237 is, for example, a three-axis geomagnetic sensor.

The temperature sensor 239 detects a temperature, and outputs a voltage value or a resistance value corresponding to the detected temperature as a detection value. The temperature sensor 239 is mounted on the rear surface side of the OLED panel 243 (FIG. 2). The temperature sensor 239 may be mounted on the same board as, for example, that of the OLED drive circuit 245. With this configuration, the temperature sensor 239 generally detects the temperature of the OLED panel 243.

The temperature sensor 239 may be built into the OLED panel 243 or the OLED drive circuit 245. The board may be a semiconductor board. Specifically, in a case where the OLED panel 243 is mounted as an integrated circuit on an integrated semiconductor chip along with the OLED drive circuit 245 and the like by using a Si-OLED, the temperature sensor 239 may be mounted in the semiconductor chip.

The camera 61, the illuminance sensor 65, and the temperature sensor 217 provided in the right display unit 22, and the six-axis sensor 235, the magnetic sensor 237, and the temperature sensor 239 provided in the left display unit 24 are connected to the sensor hub 192. The sensor hub 192 performs setting and initialization of a sampling cycle of each sensor under the control of the main processor 140. The sensor hub 192 performs conduction of each sensor, transmission of control data to each sensor, and acquisition of a detection value from each sensor, in accordance with the sampling cycle of each sensor. The sensor hub 192 outputs a detection value in each sensor of the right display unit 22 and the left display unit 24 to the main processor 140 at a preset timing. The sensor hub 192 may have a function of temporarily storing a detection value in each sensor in accordance with a timing at which the detection value is output to the main processor 140. The sensor hub 192 may have a function of converting data with various data formats into data with a unified data format and outputting the data to the main processor 140, in order to cope with a difference in a signal format of an output value from each sensor, or a data format.

The sensor hub 192 starts and stops conduction of the LED indicator 67 under the control of the main processor 140, and causes the LED indicator 67 to be lighted or blink in accordance with timings at which the camera 61 starts and finishes imaging.

The control device 10 includes a power source unit 130, and is operated by power supplied from the power source unit 130. The power source unit 130 includes a rechargeable battery 132, and a power source control circuit 134 which detects residual capacity of the battery 132 and controls charging of the battery 132. The power source control circuit 134 is connected to the main processor 140, and outputs a detection value of residual capacity of the battery 132 or a voltage detection value to the main processor 140. Power may be supplied to the image display section 20 from the control device 10 on the basis of power supplied from the power source unit 130. There may be a configuration in which the main processor 140 can control a state of supplying power to each unit of the control device 10, and the image display section 20, from the power source unit 130.

FIG. 5 is a functional block diagram of a storage section 160 and the control section 150 forming a control system of the control device 10. The storage section 160 illustrated in FIG. 5 is a logical storage section formed of the nonvolatile storage unit 121 (FIG. 4), and may include the EEPROM 215. The control section 150 and the various functional units of the control section 150 are formed through cooperation between software and hardware by the main processor 140 executing a program. The control section 150 and the respective functional units forming the control section 150 are formed by, for example, the main processor 140, the memory 122, and the nonvolatile storage unit 121.

The control section 150 performs various processes by using data stored in the storage section 160, so as to control the HMD 100.

The storage section 160 stores various pieces of data processed by the control section 150. Specifically, the storage section 160 stores setting data 161, content data 162, and a coordinate management region 163.

The setting data 161 includes various setting values for setting operations of the HMD 100. In a case where parameters, determinants, arithmetic expressions, a lookup table (LUT), and the like are used for the control section 150 to control the HMD 100, these may be included in the setting data 161.

The content data 162 is data of content including a display image or video displayed by the image display section 20 under the control of the control section 150, and includes image data or video data. The content data 162 may include audio data.

The content data 162 may be interactive content data. In other words, image data or video data included in the content data 162 is displayed by the image display section 20, an operation on the displayed image data or video data is received by the operation unit 115, and a process corresponding to the received operation is performed by the control section 150. In this case, the content data 162 may have image data of a menu screen displayed in a case where an operation is received, data for defining a process corresponding to an item included in the menu screen, and the like.

The coordinate management region 163 is a region for recording a display position of a pointer, and is generated by the control section 150 by using a storage region of the storage section 160. Details of the coordinate management region 163 will be described later.

The control section 150 has functions of an OS 151, an image processing unit 152, the imaging control unit 153, a display control unit 154, and an operation control unit 155.

The function of the OS 151 is a function of a control program stored in the storage section 160, and the other specimen units are functions of application programs executed on the OS 151.

The image processing unit 152 reads, for example, the content data 162 from the storage section 160, and separates a vertical synchronization signal VSync or a horizontal synchronization signal HSync from the read content data 162. The image processing unit 152 generates a clock signal PCLK by using a phase locked loop (PLL) circuit or the like (not illustrated) according to a cycle of the separated vertical synchronization signal VSync or horizontal synchronization signal HSync. The image processing unit 152 may perform various image processes such as resolution conversion, adjustment of luminance and saturation, and a 2D/3D conversion process on image data included in the content data 162 as necessary.

The image processing unit 152 develops image data having undergone the image process on a DRAM of the storage section 160 for each frame which is the image display unit. A region of the DRAM in which a single frame of image data is developed will be referred to as a frame region. The image processing unit 152 reads the image data from the frame region, and outputs the read image data to the image display section 20 as display image data.

The image processing unit 152 receives coordinate information indicating a display position of a pointer from the operation control unit 155. The coordinate information indicates a coordinate of the frame region of the DRAM. In a case where image data extracted from the content data 162 is already developed in the frame region of the DRAM, the image processing unit 152 superimposes an image of a pointer on the coordinate of the frame region indicated by the coordinate information which is input from the operation control unit 155. In a case where image data is not developed in the frame region of the DRAM, the image processing unit 152 develops an image of a pointer at a coordinate of the frame region indicated by the coordinate information which is input from the operation control unit 155. Thereafter, the image processing unit 152 reads data from the frame region of the DRAM, and transmits the data to the image display section 20.

The image processing unit 152 may be configured to be realized by the main processor 140 executing a program, and may be configured to be realized by using hardware (for example, a digital signal processor (DSP)) other than the main processor 140.

The imaging control unit 153 controls the camera 61 to perform imaging so that captured image data is generated and is temporarily stored in the storage section 160. In a case where the camera 61 is configured as a camera unit including a circuit generating captured image data, the imaging control unit 153 acquires captured image data from the camera 61, and temporarily stores the captured image data in the storage section 160.

The display control unit 154 generates control signals for controlling the right display unit 22 and the left display unit 24, and controls generation and emission of image light from the right display unit 22 and the left display unit 24 by using the control signals. Specifically, the display control unit 154 controls the OLED drive circuits 225 and 245 on the basis of synchronization signals which are input from the image processing unit 152, so as to control timings at which images are drawn on the OLED panels 223 and 243 and to control luminance of the OLED panels 223 and 243.

The operation control unit 155 determines a display position of a pointer on the basis of operation information which is input from the input operation acquisition unit 110, and gives an instruction for the determined display position to the image processing unit 152. An image of the pointer is displayed at the determined display position in the display region VR through the above-described operation of the operation control unit 155.

In the present embodiment, regarding an operation mode of a pointer using the track pad 14, two operation modes such as a single-touch operation and a multi-touch operation are provided. Thus, operation modes of the control section 150 also include two modes such as a single-touch mode in a state in which the single-touch operation is acceptable and a multi-touch mode in a state in which the multi-touch operation is acceptable. The single-touch mode corresponds to a "single-operation mode" according to the invention, and the multi-touch mode corresponds to a "multi-operation mode" according to the invention.

In a case where an operation mode is the single-touch mode, the control section 150 displays a single pointer on the image display section 20. In the single-touch mode, a displayed pointer will be referred to as a single-real pointer 310. In a case where an operation mode is the multi-touch mode, the control section 150 displays a plurality of pointers on the image display section 20. In the present embodiment, in a case where an operation mode is the multi-touch mode, three pointers are displayed. Such pointers will be referred to as a multi-real pointer 320, a pseudo-pointer 330, and a base pointer 340. The multi-real pointer 320 corresponds to a "first object" according to the invention, and the pseudo-pointer 330 corresponds to a "second object" according to the invention.

As an image of the multi-real pointer 320 displayed in the display region VR by the image display section 20, an image which is more conspicuous than an image of the pseudo-pointer 330 or the base pointer 340 is used. For example, a size of an image of the multi-real pointer 320 is made larger than a size of an image of the pseudo-pointer 330 or the base pointer 340. As an image of the multi-real pointer 320, an image with brightness or saturation higher than that of an image of the pseudo-pointer 330 or the base pointer 340 may be used. The transmittance of an image of the pseudo-pointer 330 or the base pointer 340 may be made higher than the transmittance of an image of the multi-real pointer 320 so that the image of the multi-real pointer 320 is more easily viewed than the image of the pseudo-pointer 330 or the base pointer 340.

As an image of the pseudo-pointer 330, an image which is more conspicuous than an image of the base pointer 340 is used. In the same manner as in the case of the multi-real pointer 320, a size of an image of the pseudo-pointer 330 is made larger than a size of an image of the base pointer 340, or brightness or saturation of an image of the pseudo-pointer 330 is made higher than that of an image of the base pointer 340. The transmittance of an image of the base pointer 340 may be made higher than the transmittance of an image of the pseudo-pointer 330 so that the image of the pseudo-pointer 330 is more easily viewed than the image of the base pointer 340.

The single-real pointer 310 and the multi-real pointer 320 are pointers for changing a display position in the display region VR according to a touch operation on the operation surface 14a. If a touch operation is detected, the operation control unit 155 moves display positions of the single-real pointer 310 and the multi-real pointer 320 by a distance corresponding to a movement distance of the touch operation in a direction corresponding to a movement direction of the touch operation. The pseudo-pointer 330 is a pointer for changing a display position according to a change of a display position of the multi-real pointer 320, and is displayed at a position symmetric to the multi-real pointer 320 with respect to a linearly symmetric axis or the point symmetric center. The base pointer 340 is a pointer displayed at a position on a linearly symmetric axis or a position of the point symmetric center. The linearly symmetric axis or the point symmetric center corresponds to a "set position" according to the invention.

The multi-touch mode includes two modes such as a point symmetric mode and a linearly symmetric mode. In the multi-touch mode, the multi-real pointer 320 and the pseudo-pointer 330 are displayed at opposing positions with a linearly symmetric axis or the point symmetric center interposed therebetween.

In a case where an operation mode is the point symmetric mode, the operation control unit 155 displays the pseudo-pointer 330 at a position which is point symmetric to the multi-real pointer 320 with the base pointer 340 as the point symmetric center. In a case where an operation mode is the linearly symmetric mode, the operation control unit 155 displays the pseudo-pointer 330 at a position which is linearly symmetric to the multi-real pointer 320 with respect to a linearly symmetric axis.

In a case where an operation mode is the single-touch mode, the operation control unit 155 calculates a coordinate indicating a display position of the single-real pointer 310 on the basis of operation information which is input from the input operation acquisition unit 110. The operation control unit 155 records information indicating the display position of the single-real pointer 310 in correlation with a coordinate on the coordinate management region 163 corresponding to the calculated coordinate. Hereinafter, a coordinate correlated with information indicating a display position will be referred to as a coordinate of the single-real pointer 310.

The coordinate management region 163 is a region for recording a coordinate indicating a display position of a pointer, and is generated by the operation control unit 155 by using a storage region of the storage section 160. The coordinate on the coordinate management region 163 is correlated with a coordinate on the frame region of the DRAM in which the image processing unit 152 develops image data. In other words, if an instruction for a coordinate on the coordinate management region 163 is given from the operation control unit 155 as a display position of the single-real pointer 310, an image of the single-real pointer 310 is developed at the coordinate on the frame region of the DRAM correlated with the coordinate. Consequently, an image of the single-real pointer 310 is displayed at a display position in the display region VR determined by the operation control unit 155.

The operation information which is input from the input operation acquisition unit 110 includes information indicating a movement direction and a movement distance on the operation surface 14a of the operation finger. In a case where an operation mode is the single-touch mode, the operation control unit 155 acquires coordinate information indicating a coordinate of the single-real pointer 310 from the coordinate management region 163. The operation control unit 155 adds or subtracts the movement distance included in the operation information to or from the coordinate indicated by the acquired coordinate information on the basis of the movement direction included in the operation information, so as to calculate a coordinate after movement based on the operation information. The operation control unit 155 stores information indicating the display position of the single-real pointer 310 in correlation with the calculated coordinate on the coordinate management region 163. In this case, the information indicating the display position of the single-real pointer 310 correlated with the coordinate on the coordinate management region 163 before movement may be erased.

The operation control unit 155 outputs coordinate information indicating the coordinate after movement to the image processing unit 152. The image processing unit 152 develops an image of the single-real pointer 310 at a coordinate on the frame region of the DRAM corresponding to the coordinate indicated by the coordinate information which is input from the operation control unit 155. The image processing unit 152 outputs image data in which the image of the single-real pointer 310 is developed to the image display section 20 as display image data. Consequently, the image of the single-real pointer 310 is displayed at a position corresponding to the operation on the track pad 14 in the display region VR of the image display section 20.

Figure 6:
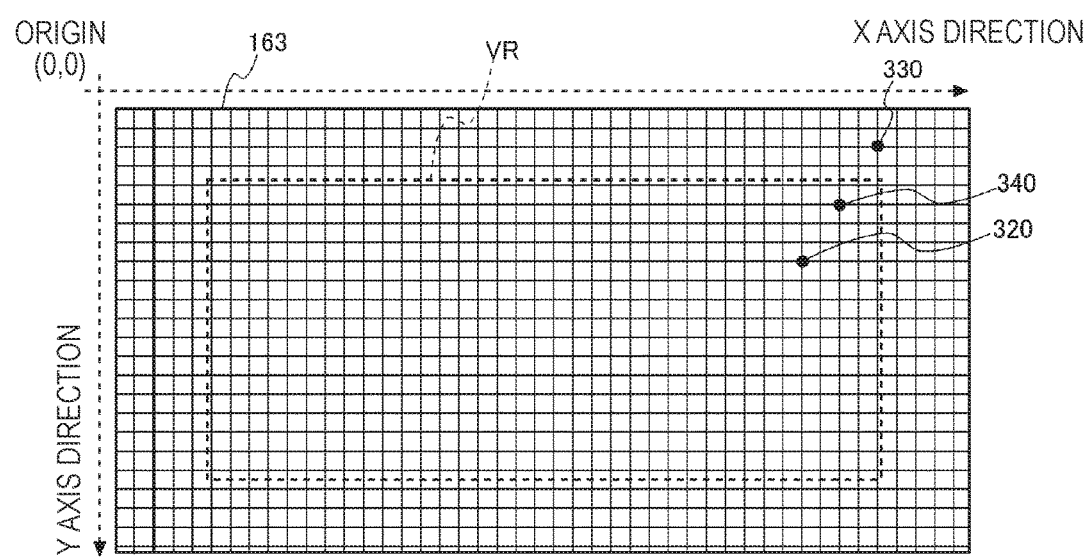
FIG. 6 is a diagram illustrating a coordinate management region.

FIG. 6 is a diagram illustrating the coordinate management region 163.

A coordinate system is set in the coordinate management region 163. The coordinate system is used to manage display positions of pointers (the single-real pointer 310, the multi-real pointer 320, the pseudo-pointer 330, and the base pointer 340). In the present embodiment, the coordinate system set in the coordinate management region 163 has the upper left of the coordinate management region 163 as the origin, a horizontal direction of the coordinate management region 163 as an X axis direction, and a vertical direction of the coordinate management region 163 as a Y axis direction.

The operation control unit 155 determines a position after movement of the operation finger, that is, a coordinate on the coordinate management region 163, on the basis of a coordinate on the coordinate management region 163 indicating a position before the operation finger is moved, and information indicating a movement direction and a movement distance of the operation finger which is input from the input operation acquisition unit 110. In other words, since the coordinate on the coordinate management region 163 is determined on the basis of the movement direction and the movement distance of the operation finger, a size of the coordinate management region 163 is not required to be same as a size of the operation surface 14a of the track pad 14, and may be larger than the size of the operation surface 14a. In this case, a coordinate recorded in the coordinate management region 163 is a coordinate indicating a relative coordinate. A pointer can be displayed by using a coordinate on the coordinate management region 163 as a coordinate on the display region VR as long as a size of the coordinate management region 163 is the same as a size of the display region VR which is a range in which the image display section 20 can display an image. In a case where a size of the coordinate management region 163 is not the same as a size of the display region VR, coordinate conversion may be performed so that a coordinate on the coordinate management region 163 is converted into a coordinate on the display region VR.

A size of the coordinate management region 163 may be the same as a size of the operation surface 14a of the track pad 14, and the operation control unit 155 may correlate a coordinate on the operation surface 14a as a coordinate on the coordinate management region 163 without conversion. In this case, a coordinate recorded in the coordinate management region 163 is a coordinate indicating an absolute coordinate.

The display region VR of the image display section 20 is displayed to overlap the coordinate management region 163 illustrated in FIG. 6. As illustrated in FIG. 6, a size of the coordinate management region 163 is set to be larger than a size of the display region VR, that is, the frame region of the DRAM. Thus, the operation control unit 155 can record even a coordinate not included in the range of the display region VR in the coordinate management region 163.

For example, a size of the coordinate management region 163 may be set to be nine times the size of the operation surface 14a, corresponding to a size in which three operation surfaces 14a of the track pad 14 are arranged horizontally and three operation surfaces 14a are arranged vertically. In a case where a size of the coordinate management region 163 is set to such a size, even if an operation mode is a point symmetric mode, coordinates of the multi-real pointer 320, the pseudo-pointer 330, and the base pointer 340 can be managed in the coordinate management region 163. For example, it is assumed that the base pointer 340 is located at one end of a diagonal line of the operation surface 14a, and the multi-real pointer 320 is located at the other end of the diagonal line. A position of the pseudo-pointer 330 in a case of the point symmetric mode is opposite to a position of the multi-real pointer 320 with the base pointer 340 as the point symmetric center. A distance between the base pointer 340 and the pseudo-pointer 330 is the same as a distance between the multi-real pointer 320 and the base pointer 340. If a size of the coordinate management region 163 is set to be nine times the size of the operation surface 14a, a coordinate of the pseudo-pointer 330 can be recorded in the coordinate management region 163 even in a case where a distance between the multi-real pointer 320 and the base pointer 340 is increased by a distance of the diagonal line of the operation surface 14a.

FIG. 6 illustrates a state in which the multi-real pointer 320, the pseudo-pointer 330, and the base pointer 340 are correlated with coordinates in the coordinate management region 163. FIG. 6 illustrates a case where the multi-real pointer 320 and the base pointer 340 are correlated with coordinates inside the display region VR, and the pseudo-pointer 330 is correlated with a coordinate outside the display region VR. This is because the pseudo-pointer 330 is required to be displayed at a symmetric position to the multi-real pointer 320, and thus the pseudo-pointer 330 may be located outside the display region VR even if the multi-real pointer 320 is located inside the display region VR.

In a case where there is a pointer correlated with a coordinate located outside the display region VR, the operation control unit 155 changes a display aspect of an image of the pointer. For example, the pseudo-pointer 330 is correlated with a coordinate outside the display region VR, the operation control unit 155 erases display of the pseudo-pointer 330 from the display region VR. The operation control unit 155 may display an image indicating that the pseudo-pointer 330 is being erased in the display region VR.

Even if the pseudo-pointer 330 is correlated with a coordinate outside the display region VR, the operation control unit 155 may display the pseudo-pointer 330 at the end part of the display region VR without erasing the display of the pseudo-pointer 330. In this case, the operation control unit 155 may fixedly display the pseudo-pointer 330 at a constant position (for example, the end part of the display region VR), and may cause the pseudo-pointer 330 to be lighted or to blink until a coordinate of the pseudo-pointer 330 is correlated with a coordinate on the display region VR. The operation control unit 155 may display an auxiliary image 360 (refer to FIG. 18) indicating a position of the pseudo-pointer 330.

If the trigger button 135 is pressed, and thus an operation mode is changed to the multi-touch mode, the operation control unit 155 records, in the coordinate management region 163, coordinates indicating display positions of three pointers such as the multi-real pointer 320, the pseudo-pointer 330, and the base pointer 340.

First, if the trigger button 135 is pressed, the operation control unit 155 sets a coordinate of the single-real pointer 310 recorded in the coordinate management region 163 when the trigger button 135 is pressed to coordinates of the multi-real pointer 320, the pseudo-pointer 330, and the base pointer 340. Thereafter, the operation control unit 155 changes the coordinates of the multi-real pointer 320 and the pseudo-pointer 330 on the basis of operation information which is input from the track pad 14. A coordinate of the base pointer 340 is fixed to the coordinate when the trigger button 135 is pressed, and the operation control unit 155 does not change the coordinate of the base pointer 340.

FIGS. 7 to 14 are diagrams illustrating the operation surface 14a of the track pad 14 and the display region VR of the image display section 20. First, with reference to FIGS. 7 to 10, a description will be made of movement of the multi-real pointer 320 and the pseudo-pointer 330 in a case of the point symmetric mode.

Figure 7:
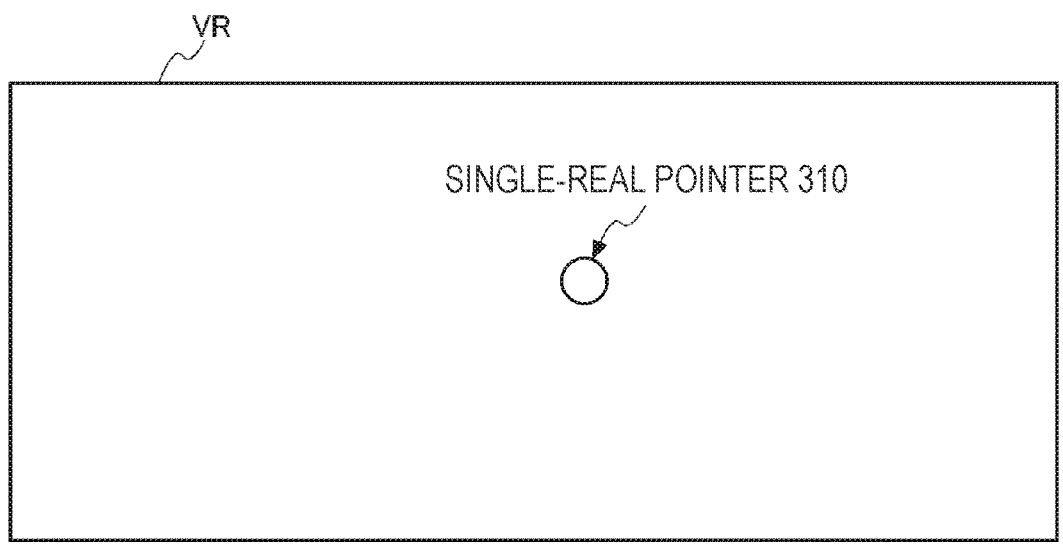
FIG. 7 is a diagram illustrating an operation surface of a track pad and a display region of the image display section.
Figure 7:
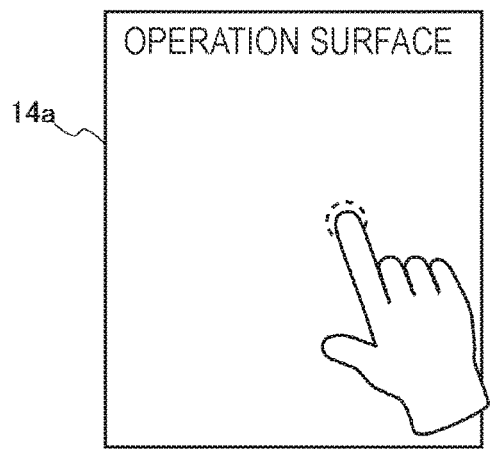

FIG. 7 illustrates a display state of the display region VR in a case where an operation mode of the control section 150 is the single-touch mode. In a case where an operation mode is the single-touch mode, the single-real pointer 310 is displayed in the display region VR. A display position of the single-real pointer 310 on the display region VR is changed according to movement of the operation finger on the operation surface 14a. In a case where an operation mode is the single-touch mode, only the single-real pointer 310 is displayed in the display region VR, and the pseudo-pointer 330 or the base pointer 340 displayed in the multi-touch mode is not displayed.

Figure 8:
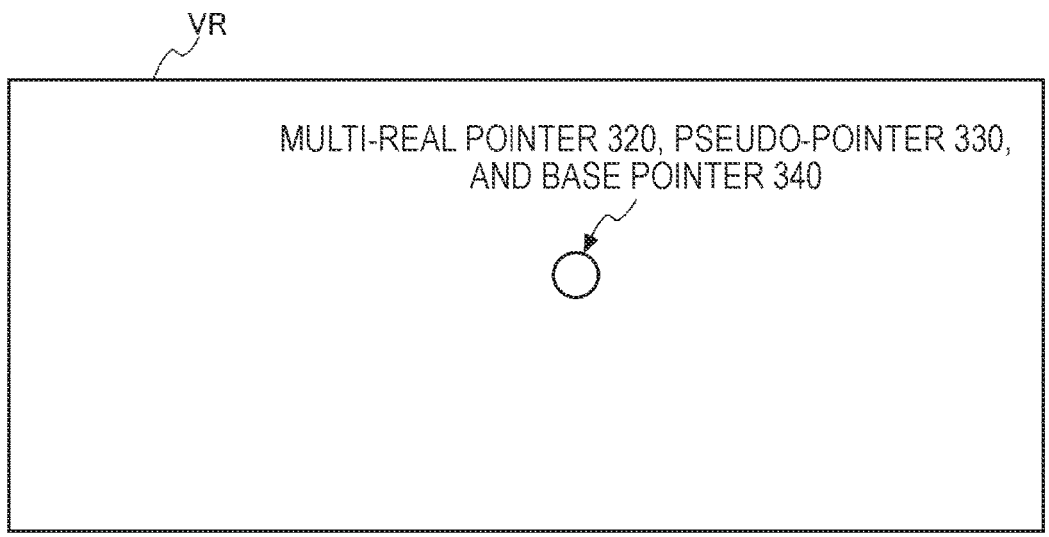
FIG. 8 is a diagram illustrating the operation surface of the track pad and the display region of the image display section.
Figure 8:
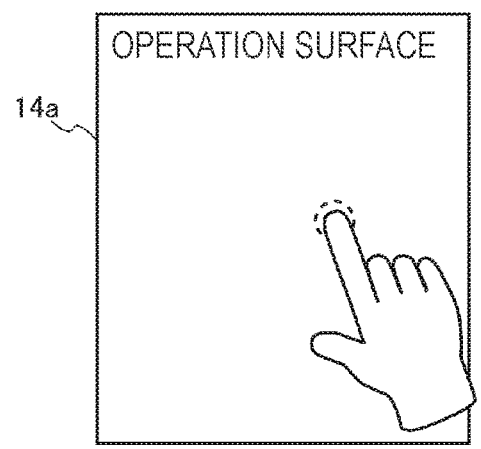

If the trigger button 135 is pressed, and thus an operation mode for a pointer is changed from the single-touch mode to the multi-touch mode, the operation control unit 155 displays the multi-real pointer 320, the pseudo-pointer 330, and the base pointer 340 in the display region VR. FIG. 8 illustrates a display state of the display region VR right after an operation mode is changed to the multi-touch mode. The multi-real pointer 320, the pseudo-pointer 330, and the base pointer 340 are displayed to overlap the display position of the single-real pointer 310 in the single-touch mode. If the user moves the operation finger on the operation surface 14*a* in this state, display positions of the multi-real pointer 320 and the pseudo-pointer 330 are changed. The base pointer 340 is fixed to the display position of the single-real pointer 310 when the trigger button 135 is pressed, and is not moved from the display position.

Figure 9:
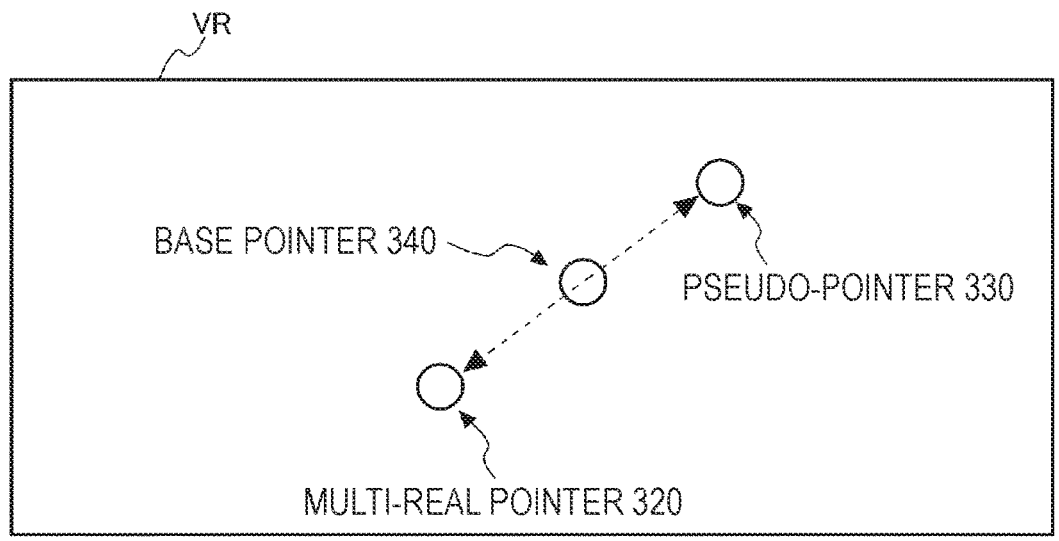
FIG. 9 is a diagram illustrating the operation surface of the track pad and the display region of the image display section.
Figure 9:
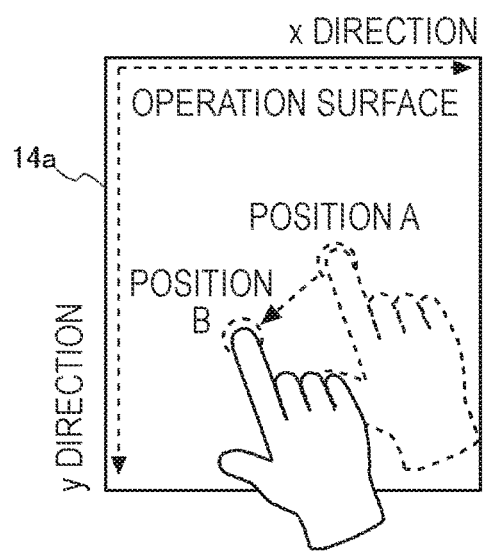

FIG. 9 illustrates a case where the operation finger is moved from a position A to a position B on the operation surface 14*a*.

The operation control unit 155 receives operation information from the input operation acquisition unit 110. The input operation acquisition unit 110 calculates a direction vector indicating a movement direction of the operation finger and a movement distance of the movement from the position A to the position B on the basis of coordinates of the position A and the position B on the operation surface 14*a*, and outputs operation information including such calculated information to the operation control unit 155.

If the operation information is received from the input operation acquisition unit 110, the operation control unit 155 calculates coordinates of the multi-real pointer 320 and the pseudo-pointer 330 after movement. First, the operation control unit 155 acquires coordinate information indicating a coordinate of the multi-real pointer 320 by using the coordinate management region 163. Next, the operation control unit 155 adds or subtracts the movement distance included in the operation information to or from the coordinate indicated by the acquired coordinate information on the basis of the movement direction included in the operation information, so as to calculate a coordinate after movement based on the operation information. The operation control unit 155 records information indicating the display position of the multi-real pointer 320 in correlation with a coordinate on the coordinate management region 163 corresponding to the calculated coordinate.

FIG. 9 illustrates a change of a display position of the multi-real pointer 320 displayed in the display region VR in a case where the operation finger is moved from the position A to the position B on the operation surface 14*a*. As illustrated in FIG. 9, if the operation finger is moved from the position A to the position B in a lower left direction, a display position of the multi-real pointer 320 is also moved in the lower left direction so as to correspond to the movement of the operation finger.

If the coordinate of the multi-real pointer 320 is changed, the operation control unit 155 also changes the coordinate of the pseudo-pointer 330. The operation control unit 155 calculates a coordinate of the pseudo-pointer 330 so that a display position of the pseudo-pointer 330 is point symmetric to a display position of the multi-real pointer 320 with the coordinate of the base pointer 340 as the point symmetric center.

First, the operation control unit 155 acquires coordinate information indicating a coordinate of the pseudo-pointer 330 from the coordinate management region 163. The operation control unit 155 adds or subtracts the movement distance included in the operation information to or from the coordinate of the pseudo-pointer 330 indicated by the acquired coordinate information, and moves the coordinate of the pseudo-pointer 330 in a direction 180 degrees opposite to the movement direction included in the operation information. The operation control unit 155 records information indicating the display position of the multi-real pointer 320 in correlation with a coordinate on the coordinate management region 163 corresponding to the calculated coordinate.

The operation control unit 155 may calculate a coordinate of the pseudo-pointer 330 on the basis of a coordinate of the multi-real pointer 320 after movement and a coordinate of the base pointer 340. In other words, the operation control unit 155 calculates a coordinate which is point symmetric to the coordinate of the multi-real pointer 320 with the coordinate of the base pointer 340 as the point symmetric center, and sets the calculated coordinate as a coordinate of the pseudo-pointer 330.

As illustrated in FIG. 9, in a case where the operation finger is moved from the position A to the position B in the lower left direction, a display position of the pseudo-pointer 330 is moved in a direction 180 degrees opposite to the movement direction of the operation finger.

Figure 10:
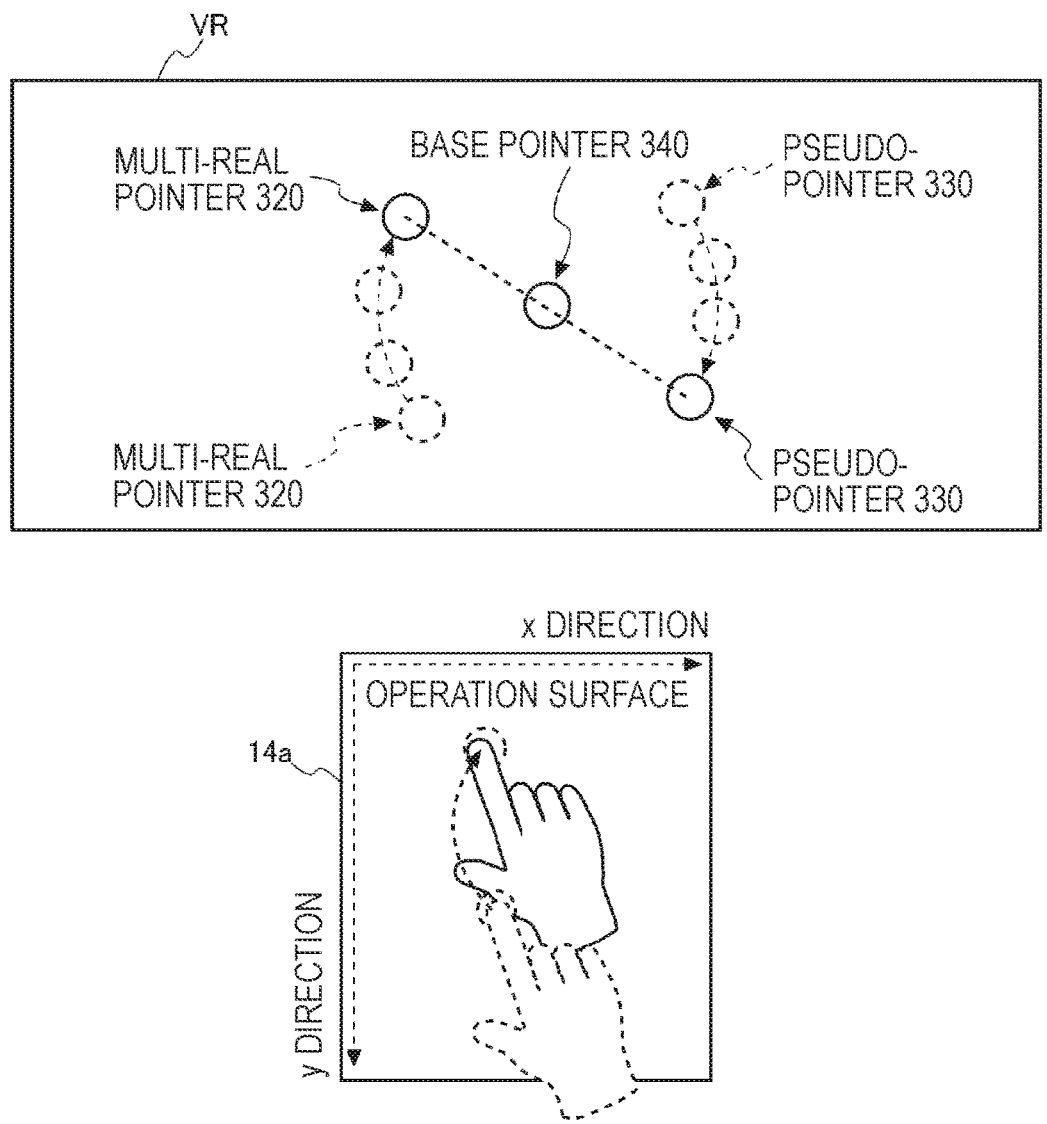
FIG. 10 is a diagram illustrating the operation surface of the track pad and the display region of the image display section.

FIG. 10 illustrates trajectories of movement of the multi-real pointer 320 and the pseudo-pointer 330 in a case where the operation finger of the user is moved in the upward direction while drawing a circle on the operation surface 14*a*.

As described above, the operation control unit 155 changes coordinates indicating display positions of the multi-real pointer 320 and the pseudo-pointer 330 on the basis of operation information which is input from the input operation acquisition unit 110, and thus display positions of the multi-real pointer 320 and the pseudo-pointer 330 are changed so as to correspond to a trajectory of movement of the operation finger on the operation surface 14*a*. In other words, the multi-real pointer 320 is moved in the upward direction while drawing a circle so as to correspond to the movement of the operation finger, and the pseudo-pointer 330 is moved in the downward direction while drawing a circle so as to correspond to the movement of the operation finger.

Figure 11:
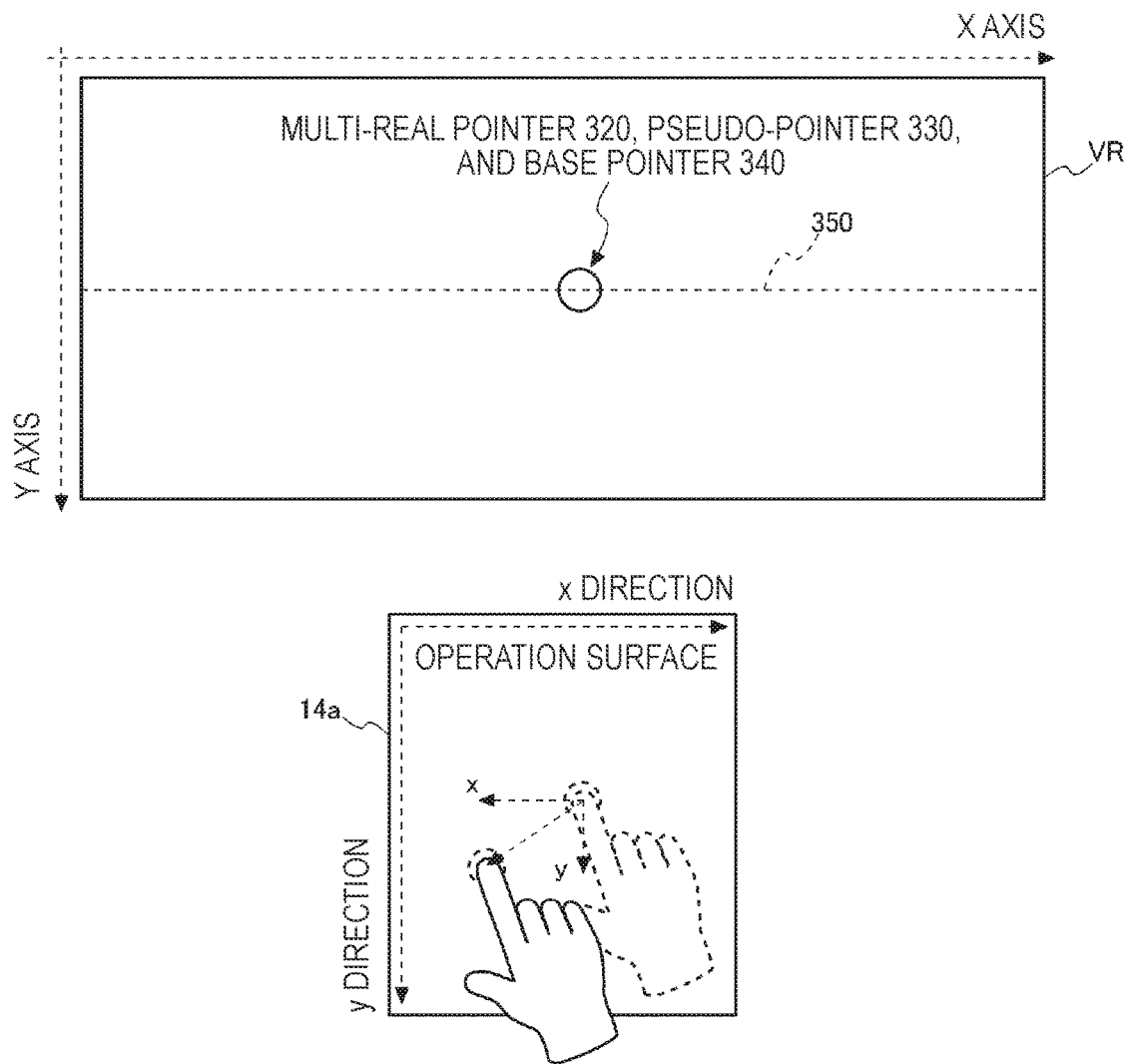
FIG. 11 is a diagram illustrating the operation surface of the track pad and the display region of the image display section.
Figure 12:
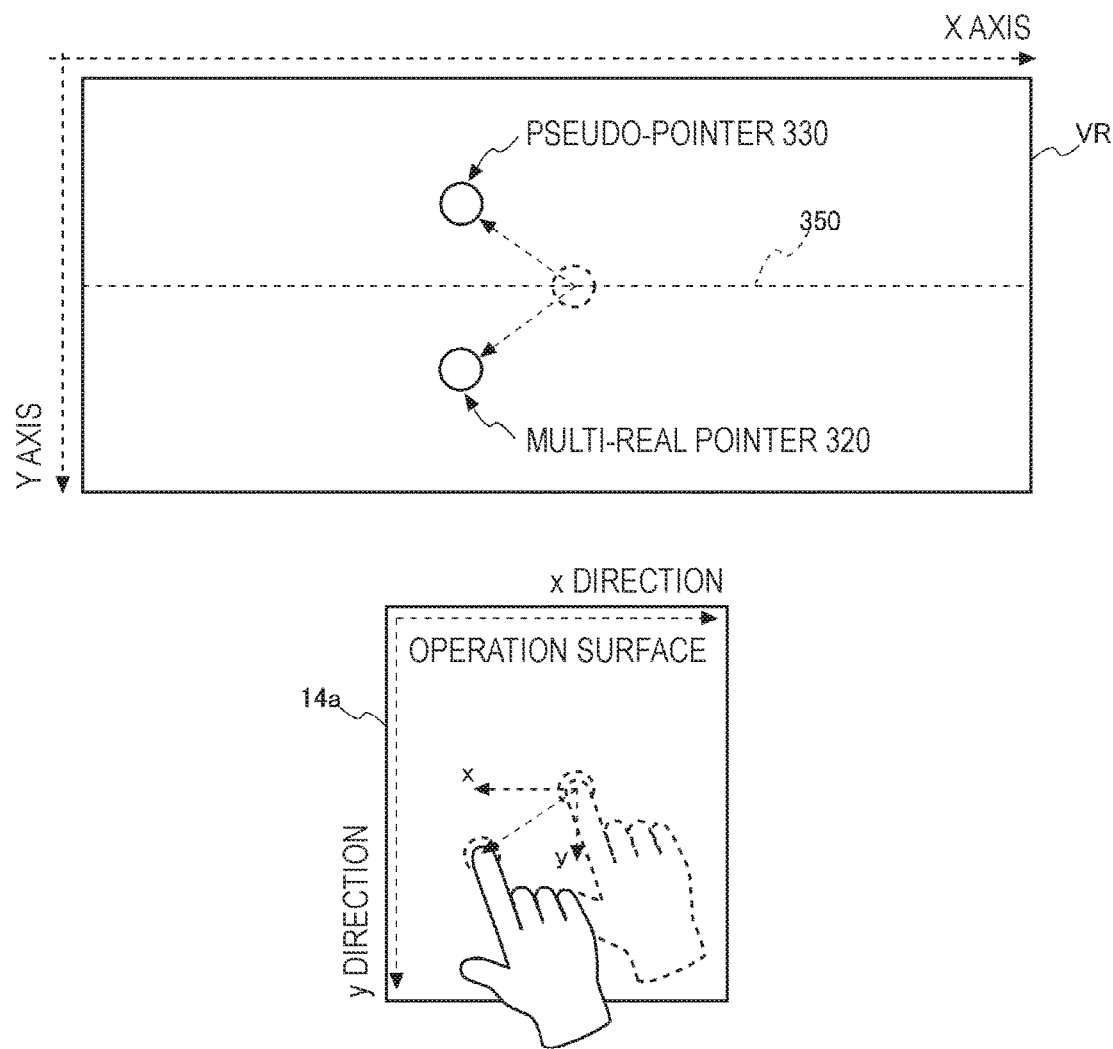
FIG. 12 is a diagram illustrating the operation surface of the track pad and the display region of the image display section.
Figure 13:
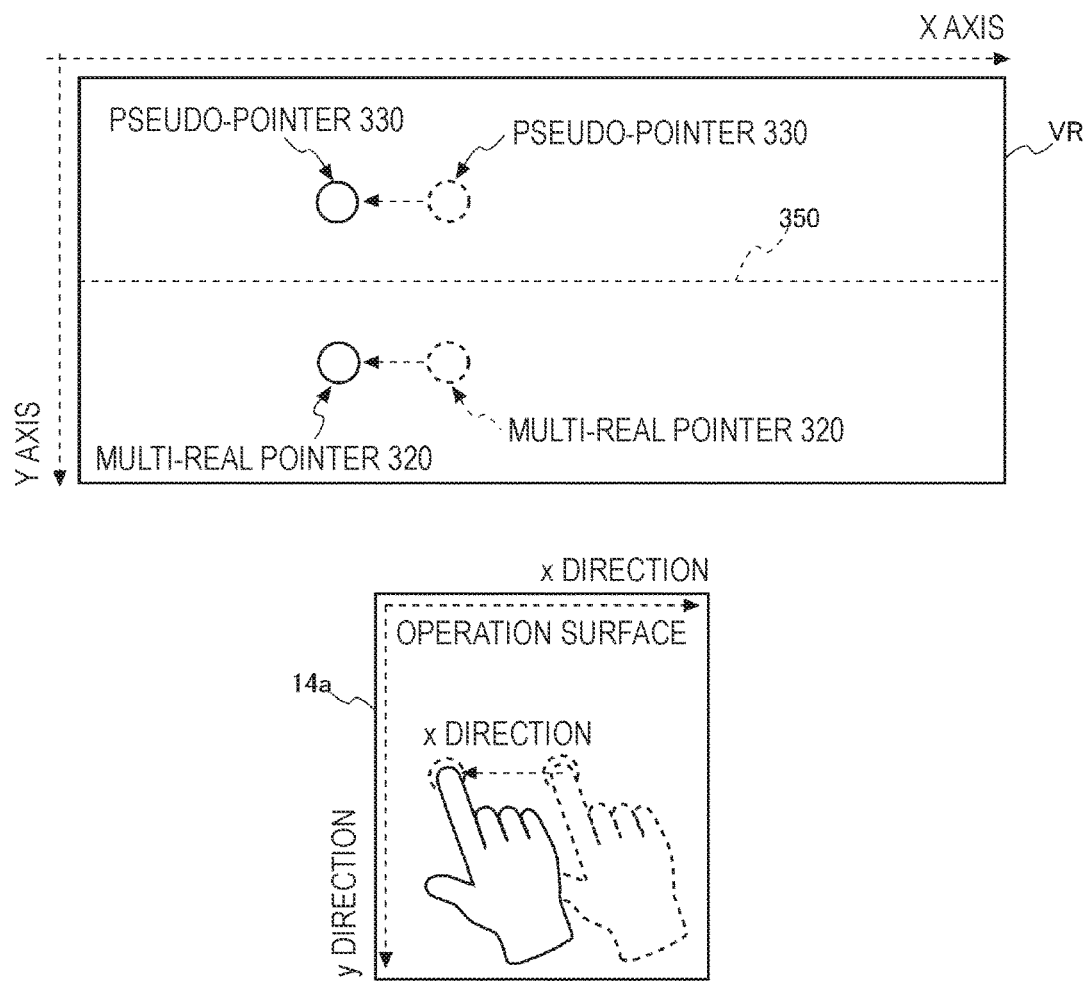
FIG. 13 is a diagram illustrating the operation surface of the track pad and the display region of the image display section.

FIGS. 11 to 13 are diagrams illustrating the operation surface 14*a* of the track pad 14 and the display region VR of the image display section 20. With reference to FIGS. 11 to 13, a description will be made of movement of the multi-real pointer 320 and the pseudo-pointer 330 in a case of the linearly symmetric mode.

Operations in which the trigger button 135 is pressed so that an operation mode is changed to the multi-touch mode, and the multi-real pointer 320, the pseudo-pointer 330, and the base pointer 340 are displayed in an overlapping state with the same position in the display region VR are the same as operations in a case of the point symmetric mode.

If operation information is input from the input operation acquisition unit 110, first, the operation control unit 155 determines a direction in which a linearly symmetric axis 350 is set on the basis of the input operation information.

The operation control unit 155 calculates a movement distance of the operation finger in an x direction and a movement distance in a y direction on the basis of information regarding a movement direction and a movement distance included in the operation information and compares the movement distances. The x direction corresponds to the horizontal direction of the operation surface 14*a*, and the y direction corresponds to the vertical direction of the operation surface 14*a*. In a case where a movement distance in the x direction is longer than a movement distance in the y direction, the operation control unit 155 sets the linearly symmetric axis 350 in the X axis direction of the coordinate management region 163, that is, the X axis direction of the display region VR. In a case where a movement distance in the y direction is longer than a movement distance in the x direction, the operation control unit 155 sets the linearly symmetric axis 350 in the Y axis direction of the coordinate management region 163, that is, the Y axis direction of the display region VR.

FIG. 11 illustrates a case where the linearly symmetric axis 350 is set in a direction parallel to the X axis direction of the display region VR.

In a case where a movement distance in the x direction is longer than a movement distance in the y direction, the operation control unit 155 sets the linearly symmetric axis 350 in a direction parallel to the X axis direction of the coordinate management region 163. The operation control unit 155 sets a Y coordinate on the coordinate management region 163 in which the linearly symmetric axis 350 is set, to a Y coordinate of the base pointer 340. In other words, the operation control unit 155 sets the linearly symmetric axis 350 which passes through the display position of the base pointer 340 in the direction parallel to the X axis direction of the coordinate management region 163.

FIGS. 12 and 13 are diagrams illustrating movement of the multi-real pointer 320 and the pseudo-pointer 330 in the linearly symmetric mode.

If the linearly symmetric axis 350 is set, the operation control unit 155 calculates a coordinate of the multi-real pointer 320 after movement on the basis of the operation information which is input from the input operation acquisition unit 110. A method of calculating a coordinate of the multi-real pointer 320 after movement is the same as in the cases of the single-touch mode and the point symmetric mode.

The operation control unit 155 calculates a coordinate of the pseudo-pointer 330 after movement. The operation control unit 155 calculates a position which is linearly symmetric to a coordinate of the multi-real pointer 320 after movement with respect to the linearly symmetric axis 350, as a coordinate of the pseudo-pointer 330.

For example, in a case where the linearly symmetric axis 350 is set in the direction parallel to the X axis as illustrated in FIG. 12, the operation control unit 155 obtains a difference between a Y coordinate of the multi-real pointer 320 and a Y coordinate of the symmetric axis 350, so as to calculate a distance in the Y axis direction between the multi-real pointer 320 and the symmetric axis 350. If the distance between the multi-real pointer 320 and the symmetric axis 350 in the Y axis direction is calculated, the operation control unit 155 adds or subtracts a value of the calculated distance to or from a value of the Y coordinate of the symmetric axis 350, so as to calculate a value of a Y coordinate of a position which is linearly symmetric to the multi-real pointer 320 with respect to the symmetric axis 350. The operation control unit 155 sets the calculated Y coordinate value as a Y coordinate value of the pseudo-pointer 330, and sets an X coordinate value of the multi-real pointer 320 as an X coordinate value of the pseudo-pointer 330.

A coordinate of the pseudo-pointer 330 is also determined according to the same procedures in a case where the linearly symmetric axis 350 is set in a direction parallel to the Y axis.

FIG. 13 illustrates movement of the multi-real pointer 320 and the pseudo-pointer 330 in a case where the operation finger is moved in a direction parallel to the symmetric axis 350.

In a case where the operation finger is moved in a direction parallel to the horizontal direction of the operation surface 14a, operation information which is input to the operation control unit 155 includes information indicating an x direction as a movement direction and information indicating a movement distance in the x direction as a movement distance. In this case, the operation control unit 155 moves coordinates of the multi-real pointer 320 and the pseudo-pointer 330 to coordinates in a direction parallel to the symmetric axis 350 on the basis of the operation information. Consequently, the multi-real pointer 320 and the pseudo-pointer 330 displayed in the display region VR are moved in the direction parallel to the X axis direction of the display region VR.

Figure 14:
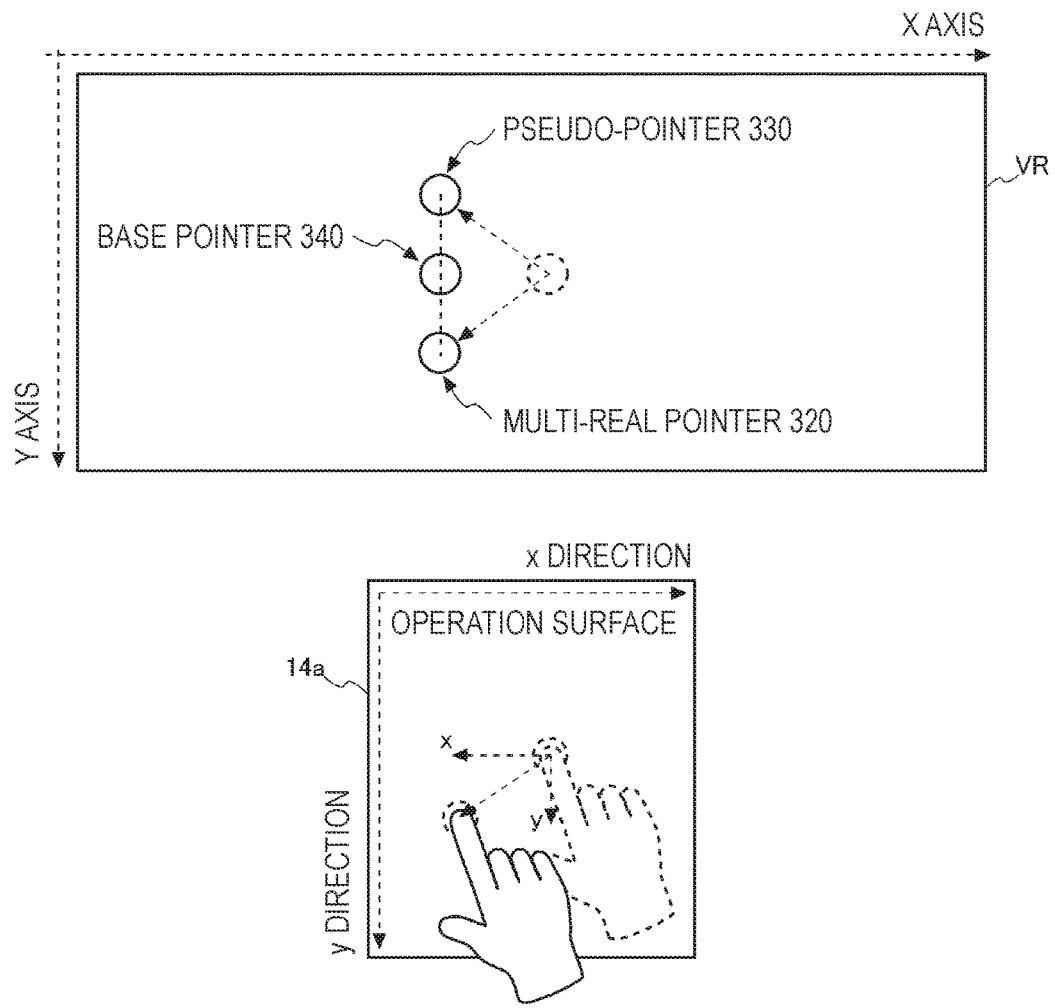
FIG. 14 is a diagram illustrating the operation surface of the track pad and the display region of the image display section.

FIGS. 12 and 13 illustrate a case where the linearly symmetric axis 350 is displayed in the display region VR, and the base pointer 340 is not displayed. FIG. 14 illustrates a case where the base pointer 340 is displayed instead of the symmetric axis 350. FIG. 14 illustrates a case where the base pointer 340 is displayed at a position of the midpoint in the Y axis direction between the multi-real pointer 320 and the pseudo-pointer 330 on the linearly symmetric axis.

In the point symmetric mode, a display position of the base pointer 340 is fixed, but, in the linearly symmetric mode, if display positions of the multi-real pointer 320 and the pseudo-pointer 330 are moved, a display position of the base pointer 340 may also be moved according to this movement. In other words, a display position of the base pointer 340 is changed so that the base pointer 340 is normally located at the midpoint between the multi-real pointer 320 and the pseudo-pointer 330.

A plurality of pseudo-pointers 330 may be displayed. For example, a display position of the base pointer 340 is not moved from a display position of the single-real pointer 310 when an operation mode is changed from the single-touch mode to the multi-touch mode. A second pseudo-pointer (not illustrated) is displayed at a position of the midpoint between the multi-real pointer 320 and the pseudo-pointer 330 on the linearly symmetric axis 350. If display positions of the multi-real pointer 320 and the pseudo-pointer 330 are changed, a display position of the second pseudo-pointer is changed according to the change of the display positions.

In a case where the trigger button 135 is continuously pressed, the operation control unit 155 does not erase the coordinates of the pointers recorded in the coordinate management region 163 even if touch of the operation finger to the operation surface 14a is not detected. In other words, coordinates of the multi-real pointer 320, the pseudo-pointer 330, and the base pointer 340 are maintained without being changed. If touch of the operation finger to the operation surface 14a is detected again, and thus operation information is input from the input operation acquisition unit 110, the operation control unit 155 calculates coordinates of the respective pointers after movement by using the coordinates of the pointers recorded in the coordinate management region 163 as coordinates before movement.

If the state of the trigger button 135 being pressed is canceled, the operation control unit 155 erases the coordinates of the multi-real pointer 320, the pseudo-pointer 330, and the base pointer 340 recorded in the coordinate management region 163. In a case where the operation finger is touched to the operation surface 14a when the state of the trigger button 135 being pressed is canceled, the single-real pointer 310 in the single-touch mode is displayed at a display position on the display region VR corresponding to the touch position on the operation surface 14a. In a case where the operation finger is not touched to the operation surface 14a when the state of the trigger button 135 being pressed is canceled, the single-real pointer 310 is displayed at a display position on the display region VR corresponding to a touch position on the operation surface 14a, detected after pressing of the trigger button 135 is canceled.

Figure 15:
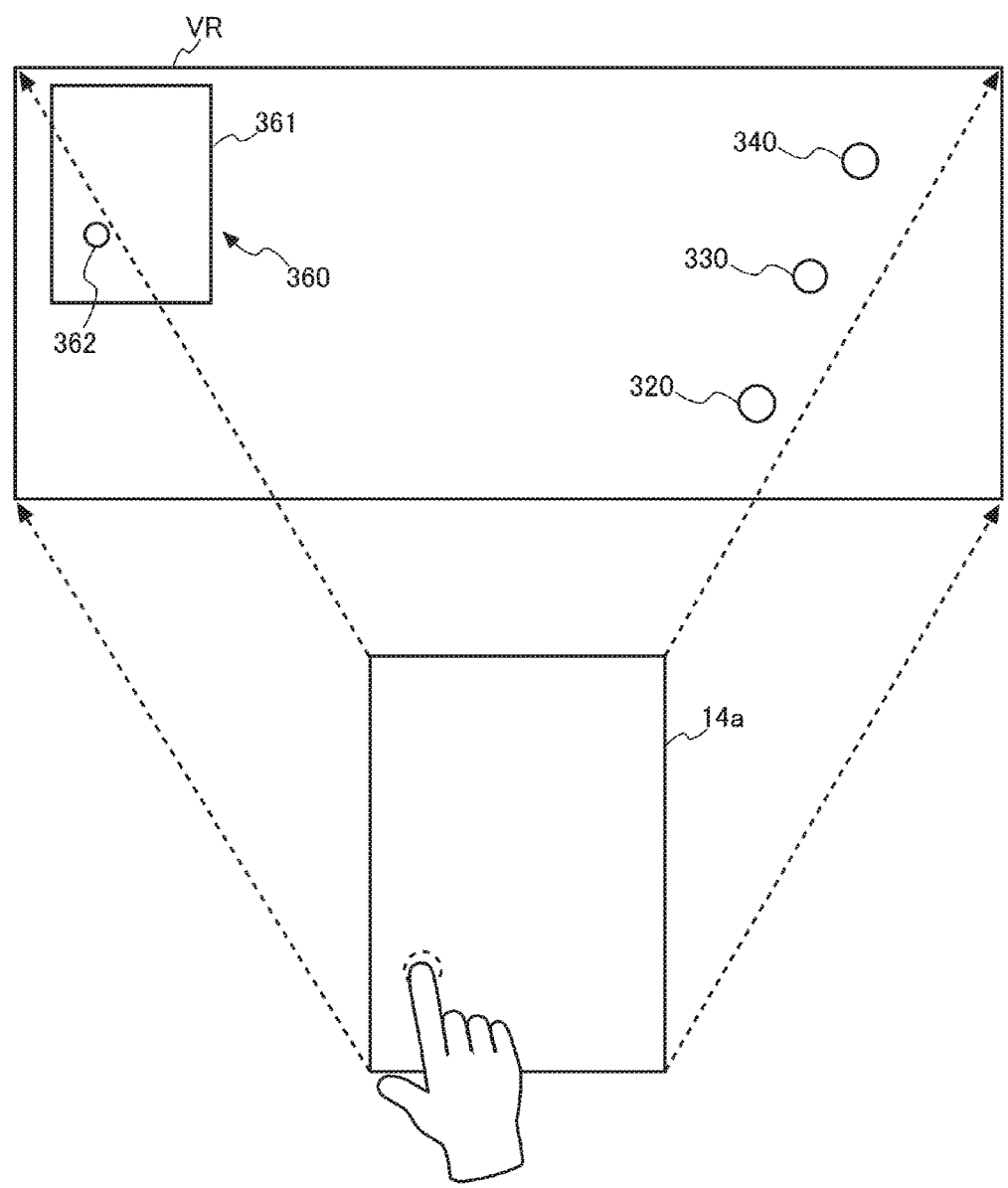
FIG. 15 is a diagram illustrating a display region in which an auxiliary image is displayed.

If an operation mode is changed to the multi-touch mode, the operation control unit 155 displays the auxiliary image 360 in the display region VR. FIG. 15 is a diagram illustrating the display region VR in which the auxiliary image 360 is displayed.

The auxiliary image 360 is an image indicating a position on the operation surface 14a where the operation finger is touched. In a state in which the image display section 20 is mounted on the head, and an image displayed by the image display section 20 is displayed in front of the eyes, there is a case where the operation surface 14a of the track pad 14 cannot be recognized or is hardly recognized. In this case, the operation finger for a touch operation may be deviated out of the operation surface 14a. Thus, if an operation mode is changed to the multi-touch mode, the operation control unit 155 displays the auxiliary image 360 indicating a position on the operation surface 14a where the operation finger is touched on the basis of operation information which is input from the input operation acquisition unit 110. An image 361 indicating the operation surface 14a of the track pad 14 and a mark 362 indicating a position on the operation surface 14a where the operation finger is touched are displayed in the auxiliary image 360.

The operation information which is input from the input operation acquisition unit 110 includes coordinate information indicating a touch position on the operation surface 14a where the operation finger is touched. The operation control unit 155 converts a coordinate indicated by the input coordinate information into a coordinate on the frame region of the DRAM in which the auxiliary image 360 is developed, the coordinate corresponding to the touch position on the operation surface 14a where the operation finger is touched. The operation control unit 155 outputs coordinate information indicating the coordinate obtained through the conversion to the image processing unit 152.

The image processing unit 152 develops data of the auxiliary image 360 in the frame region of the DRAM in which the auxiliary image 360 is scheduled to be developed. The image processing unit 152 develops an image of the mark 362 at a coordinate on the frame region corresponding to a coordinate indicated by the coordinate information which is input from the operation control unit 155. The image processing unit 152 outputs the image data developed in the frame region of the DRAM to the image display section 20 as display image data. Consequently, the auxiliary image 360 is displayed in a preset region of the display region VR. The image of the mark 362 is displayed at the coordinate on the auxiliary image 360 corresponding to the touch position on the operation surface 14a where the operation finger is touched.

Figure 16:
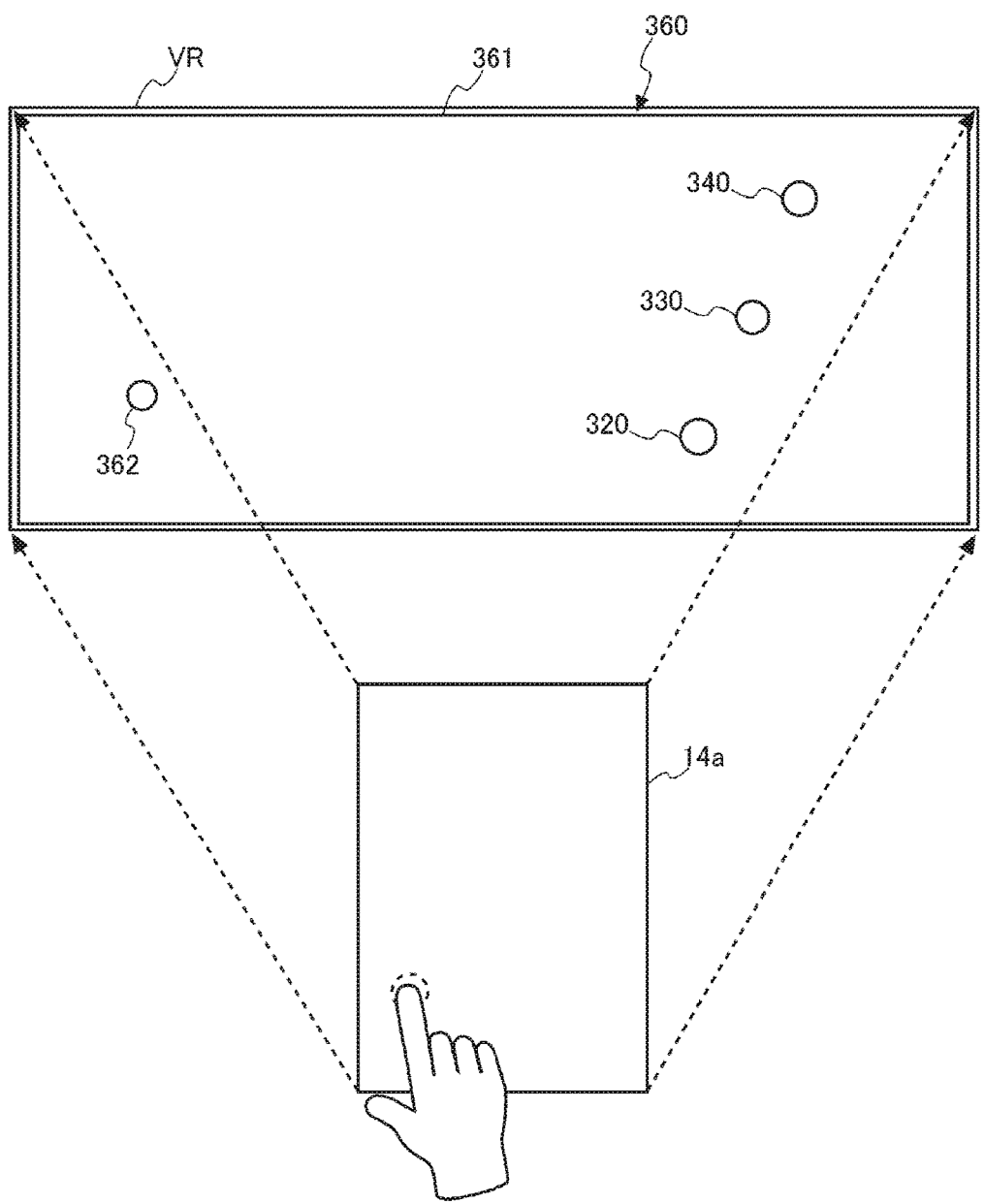
FIG. 16 is a diagram illustrating another display example of an auxiliary image.

FIG. 16 is a diagram illustrating another display example of the auxiliary image 360, and is a diagram illustrating a case where the auxiliary image 360 is displayed in the entire display region VR.

The operation control unit 155 generates a parameter for converting a coordinate on the operation surface 14a into a coordinate on the display region VR, that is, a coordinate on the frame region of the DRAM. The operation control unit 155 generates a conversion parameter for correlating coordinates of four corners of the operation surface 14a with coordinates of four corners of the frame region of the DRAM, and converting the coordinates of the four corners of the operation surface 14a into the coordinates of the four corners of the frame region. If operation information is received from the input operation acquisition unit 110, the operation control unit 155 converts a coordinate indicating a touch position on the operation surface 14a indicated by the operation information into a coordinate on the frame region of the DRAM by using the generated conversion parameter. The operation control unit 155 outputs the coordinate obtained through the conversion to the image processing unit 152, and superimposes an image of the mark 362 on a corresponding coordinate on the frame region of the DRAM.

Figure 17:
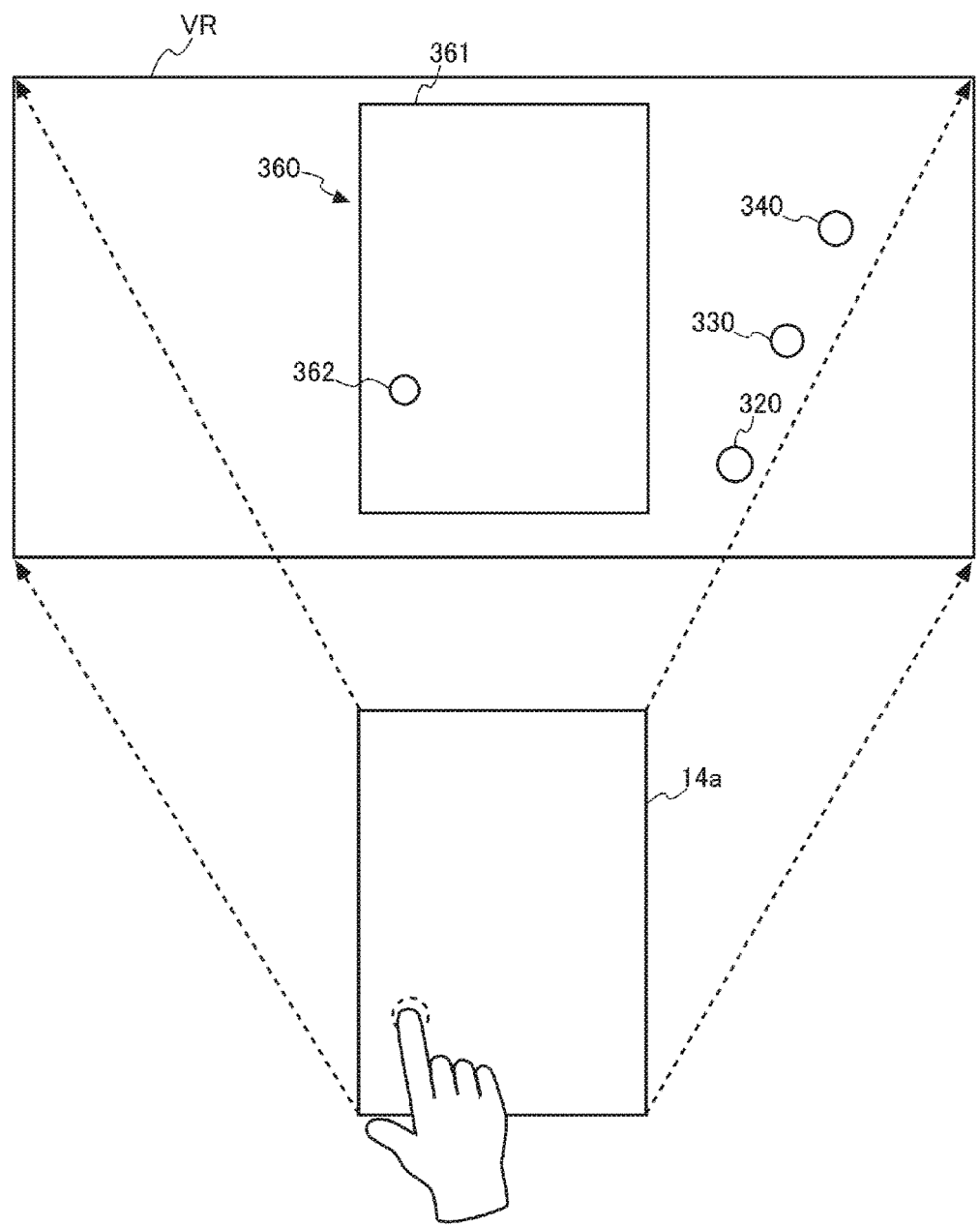
FIG. 17 is a diagram illustrating still another display example of an auxiliary image.

FIG. 17 is a diagram illustrating still another display example of the auxiliary image 360, and is a diagram illustrating a case where the auxiliary image 360 having the same size as that of the operation surface 14a is displayed in the display region VR. FIG. 17 illustrates a case where the auxiliary image 360 is displayed at the center of the display region VR, but the auxiliary image 360 may be displayed at the left end or the right end of the display region VR. In a case where the auxiliary image 360 having the same size as that of the operation surface 14a is displayed in the display region VR, a conversion process of converting a coordinate on the operation surface 14a indicated by operation information which is input from the input operation acquisition unit 110 into a coordinate on the frame region of the DRAM is simplified.

A timing at which the auxiliary image 360 is displayed in the display region VR may be a timing at which an operation mode is changed from the single-touch mode to the multi-touch mode. In a case where a touch position of the operation finger on the operation surface 14a comes close to the end part of the operation surface 14a, the auxiliary image 360 may be displayed. In a case where a distance between a touch position of the operation finger and the end part of the operation surface 14a is within a distance set as a threshold value, the operation control unit 155 may display the auxiliary image 360.

More specifically, if a touch position of the operation finger comes close to a corner of the operation surface 14a, the operation control unit 155 calculates a distance between two sides forming the corner and the touch position. In other words, the operation control unit 155 draws perpendiculars to the two sides forming the corner from a coordinate of the touch position, so as to calculate distances between the two sides and the touch position. The operation control unit 155 selects a shorter distance of the calculated distances, and compares the selected distance with the threshold value. In a case where the selected distance is equal to or less than the threshold value, the operation control unit 155 displays the auxiliary image 360. In a case where the selected distance is more than the threshold value, the operation control unit 155 does not display the auxiliary image 360. A case where a distance between a side corresponding to a shorter distance of two sides forming a corner, and a touch position is compared with a threshold value, and the distance is equal to or less than a threshold value corresponds to a "case where an operation position on an operation surface is located in a preset region" according to the invention.

If display positions of the multi-real pointer 320 and the pseudo-pointer 330 are changed, the operation control unit 155 determines an operation which is input from the user on the basis of movement of the multi-real pointer 320 and the pseudo-pointer 330 after being changed.

For example, in a case where the point symmetric mode is selected as an operation mode, the operation control unit 155 determines that an input operation is a rotation operation. The operation control unit 155 determines a rotation direction and a rotation amount of the rotation operation on the basis of display positions of the multi-real pointer 320 and the pseudo-pointer 330 before being changed and display positions of the multi-real pointer 320 and the pseudo-pointer 330 after being changed. The operation control unit 155 rotates an object such as an image displayed in the display region VR in the detected rotation direction by the detected rotation amount.

In a case where the linearly symmetric mode is selected as an operation mode, and an operation of making the multi-real pointer 320 and the pseudo-pointer 330 become distant from the symmetric axis 350 is detected, the operation control unit 155 determines this operation as an enlargement operation. In a case where the enlargement operation is determined, the operation control unit 155 calculates a distance between the multi-real pointer 320 and the pseudo-pointer 330 before movement and a distance between the multi-real pointer 320 and the pseudo-pointer 330 after movement, and enlarges an object such as an image on the basis of the calculated distances.

In a case where an operation of making the multi-real pointer 320 and the pseudo-pointer 330 come close to the symmetric axis 350 is detected, the operation control unit 155 determines this operation as a reduction operation. In a case where the reduction operation is determined, the operation control unit 155 calculates a distance between the multi-real pointer 320 and the pseudo-pointer 330 before movement and a distance between the multi-real pointer 320 and the pseudo-pointer 330 after movement, and reduces an object such as an image on the basis of the calculated distances.

In a case where an operation of moving the multi-real pointer 320 and the pseudo-pointer 330 in parallel to the symmetric axis 350, the operation control unit 155 determines this operation as parallel movement.

In a case where the parallel movement is determined, the operation control unit 155 moves an object such as an image in parallel on the basis of a movement distance of the multi-real pointer 320 in the direction of the symmetric axis 350.

Figure 18:
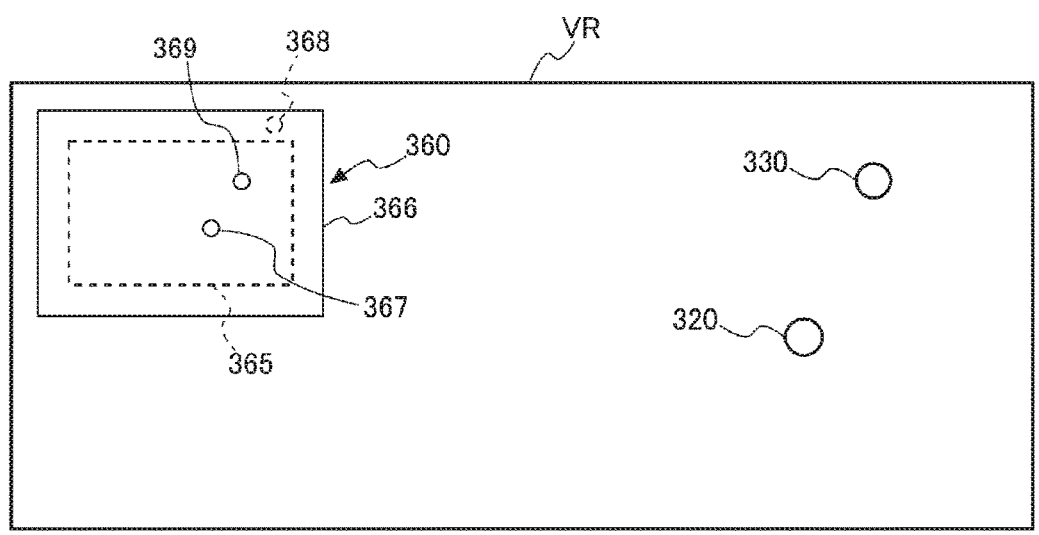
FIG. 18 is a diagram illustrating still another display example of an auxiliary image.

FIG. 18 is a diagram illustrating still another display example of the auxiliary image 360. The auxiliary image 360 illustrated in FIG. 18 is the image 360 displayed in a case where the display of the pseudo-pointer 330 is erased from the display region VR, or a case where a distance between the pseudo-pointer 330 and the end part of the display region VR is shorter than a preset distance.

As described above, in a case where there is a pointer correlated with a coordinate located outside the display region VR, the operation control unit 155 does not notify the image processing unit 152 of the coordinate of the pointer, and erases an image of the pointer from the display region VR. In a case where the pointer is erased from the display region VR, the user cannot recognize a position of the erased pointer. Thus, the operation control unit 155 may display the auxiliary image 360 illustrated in FIG. 18 in the display region VR, and may indicate a position of the erased pointer by using the auxiliary image 360. An image 365 indicating the display region VR and an image 366 indicating the coordinate management region 163 illustrated in FIG. 6 are displayed in the auxiliary image 360 illustrated in FIG. 18.

An image 367 indicating the multi-real pointer 320, an image 368 indicating the pseudo-pointer, and an image 369 indicating the base pointer 340 are displayed in the auxiliary image 360 illustrated in FIG. 18. The image 368 indicating the pseudo-pointer is displayed outside the image 365 indicating the display region VR on the image 366 indicating the coordinate management region 163.

Figure 19:
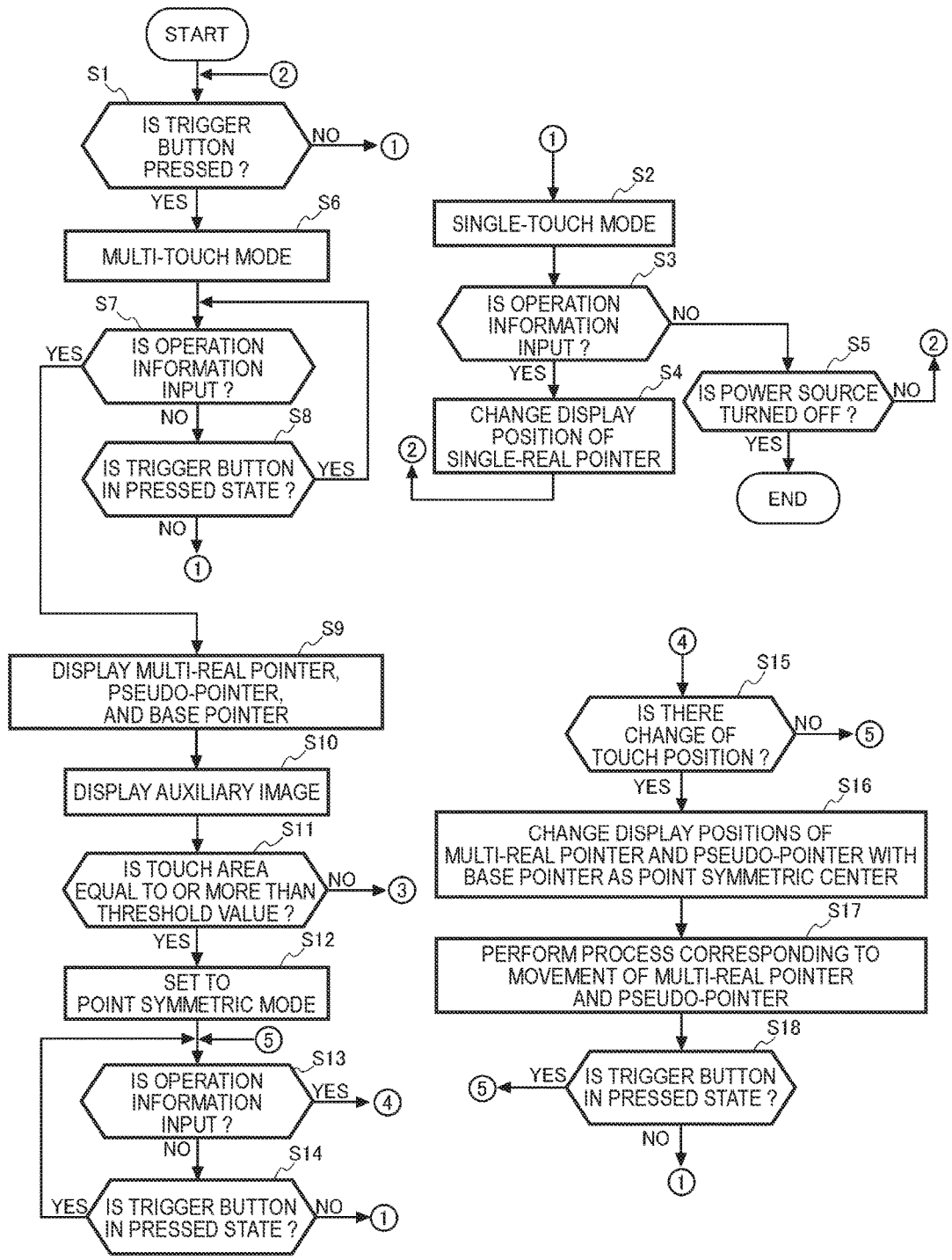
FIG. 19 is a flowchart illustrating an operation of a control section of the HMD.
Figure 20:
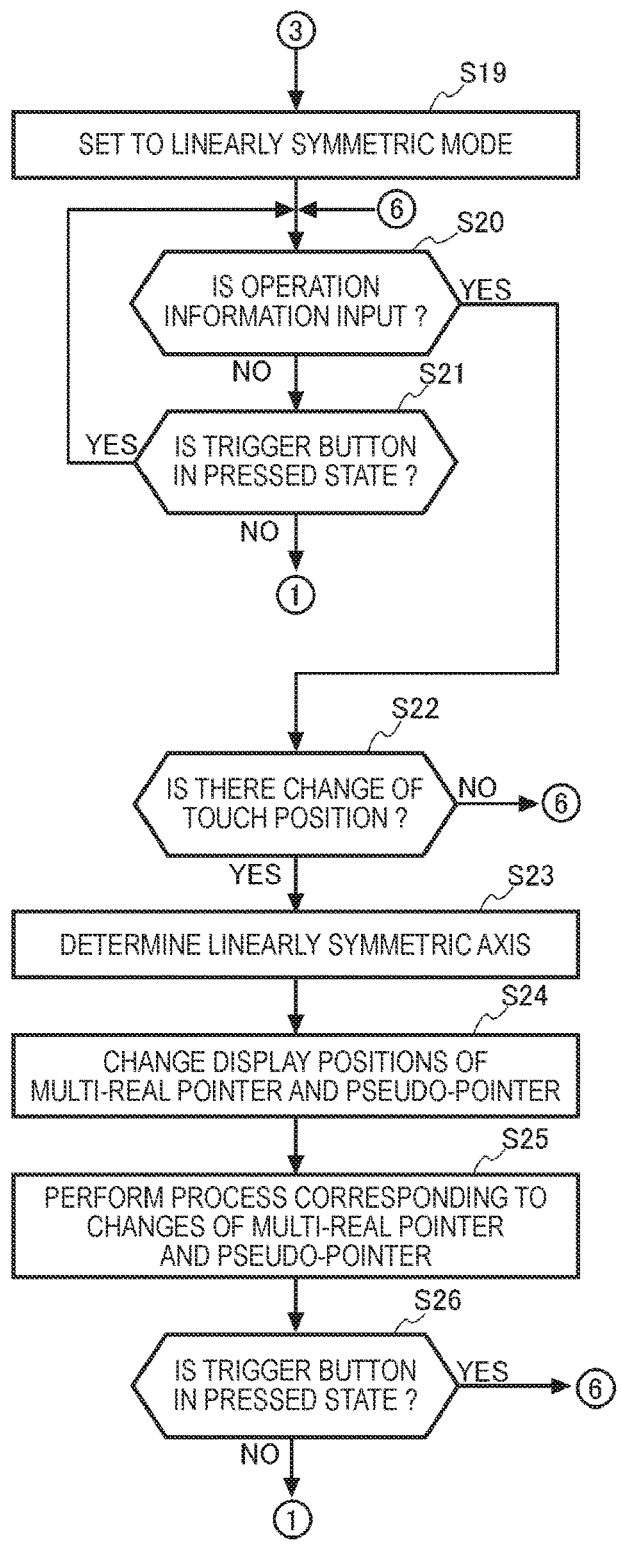
FIG. 20 is a flowchart illustrating an operation of the control section of the HMD.

FIGS. 19 and 20 are flowcharts illustrating an operation of the control section 150 of the HMD 100.

First, the control section 150 determines whether or not the trigger button 135 of the control device 10 is pressed (step S1). In a case where the trigger button 135 is not pressed (NO in step S1), the control section 150 sets an operation mode of the control section 150 to the single-touch mode (step S2), and determines whether or not operation information regarding a touch operation on the operation surface 14a is input from the input operation acquisition unit 110 (step S3). In a case where operation information is not received (NO in step S3), the control section 150 determines whether or not the power source of the HMD 100 is turned off (step S5). In a case where the power source of the HMD 100 is turned off (YES in step S5), the control section 150 stores data stored in a nonvolatile memory such as a RAM, in the storage section 160, and performs shutdown so as to finish the process.

In a case where it is determined that the power source of the HMD 100 is not turned off (NO in step S5), the control section 150 returns to step S1, and determines whether or not the trigger button 135 is pressed (step S1). In a case where the operation information is received (YES in step S3), the control section 150 moves a display position of the single-real pointer 310 according to the input operation information (step S4). If the display position of the single-real pointer 310 is changed, the control section 150 returns to step S1, and determines whether or not the trigger button 135 is pressed (step S1).

In a case where the trigger button 135 is pressed in step S1 (YES in step S1), the control section 150 sets an operation mode of the HMD 100 to the multi-touch mode (step S6). Next, the control section 150 determines whether or not operation information regarding a touch operation is input from the input operation acquisition unit 110 (step S7). In a case where operation information is not received (NO in step S7), the control section 150 determines whether or not a state of the trigger button 135 being pressed is continued (step S8). In a case where it is determined that the state of the trigger button 135 being pressed is not continued (NO in step S8), the control section 150 transitions to step S2, and changes an operation mode to the single-touch mode (step S2).

In a case where the state of the trigger button 135 being pressed is continued (YES in step S8), the control section 150 returns to step S7, and determines whether or not operation information is input from the input operation acquisition unit 110 (step S7).

In a case where the operation information is received from the input operation acquisition unit 110 (YES in step S7), the control section 150 displays a pointer at a position in the display region VR corresponding to a touch position on the operation surface 14a indicated by the operation information (step S9). In a case of the multi-touch mode, the control section 150 displays three pointers including the multi-real pointer 320, the pseudo-pointer 330, and the base pointer 340 (step S9). In this case, the multi-real pointer 320, the pseudo-pointer 330, and the base pointer 340 are displayed to overlap each other at the same position.

Next, the control section 150 displays the auxiliary image 360 in the display region VR (step S10). An image of the mark 362 indicating the touch position on the operation surface 14a indicated by the operation information is displayed in the auxiliary image 360. Next, the control section 150 acquires information indicating a touch area of the operation finger from the input operation information, and compares the touch area indicated by the acquired information with a preset threshold value. In a case where the touch area is equal to or more than the threshold value (YES in step S11), the control section 150 sets an operation mode to the point symmetric mode (step S12). The control section 150 determines whether or not the next operation information is input from the input operation acquisition unit 110 (step S13). In a case where the next operation information is not received (NO in step S13), the control section 150 determines whether or not a state of the trigger button 135 being pressed is continued (step S14). In a case where the state of the trigger button 135 being pressed is not continued (NO in step S14), the control section 150 transitions to step S2, and changes an operation mode to the single-touch mode (step S2). In a case where the state of the trigger button 135 being pressed is continued (YES in step S14), the control section 150 returns to the determination in step S13.

In a case where the operation information is received (YES in step S13), the control section 150 determines whether or not a touch position of the operation finger is changed on the basis of a movement direction and a movement distance included in the operation information (step S15). In a case where it is determined that there is no change of the touch position (NO in step S15), the control section 150 returns to step S13, and determines whether or not the next operation information is input from the input operation acquisition unit 110 (step S13). In a case where it is determined that the touch position is changed (YES in step S15), the control section 150 changes display positions of the multi-real pointer 320 and the pseudo-pointer 330 (step S16). Specifically, the control section 150 changes a display position of the multi-real pointer 320 in a direction corresponding to a movement direction included in the operation information by a distance corresponding to a movement distance included in the operation information. The control section 150 displays the pseudo-pointer 330 at a position which is point symmetric to the multi-real pointer 320 with a display position of the base pointer 340 as the point symmetric center.

Next, the control section 150 determines an input operation from the user on the basis of movement of the multi-real pointer 320 and the pseudo-pointer 330 after being changed. The control section 150 performs a process corresponding to the determined operation (step S17).

Next, the control section 150 determines whether or not the trigger button 135 is in a pressed state (step S18). In a case where the trigger button 135 is in the pressed state (YES in step S18), the control section 150 returns to step S13, and determines whether or not operation information is input from the input operation acquisition unit 110 (step S13). In a case where the pressed state of the trigger button 135 is canceled (NO in step S18), the control section 150 returns to step S2, and changes an operation mode to the single-touch mode.

In a case where it is determined that the touch area is less than the threshold value in the determination in step S11 (NO in step S11), the control section 150 selects the linearly symmetric mode as an operation mode (step S19). The control section 150 determines whether or not the next operation information is input from the input operation acquisition unit 110 (step S20). In a case where the next operation information is not received (NO in step S20), the control section 150 determines whether or not a state of the trigger button 135 being pressed is continued (step S21). In a case where the state of the trigger button 135 being pressed is not continued (NO in step S21), the control section 150 transitions to step S2, and changes an operation mode to the single-touch mode (step S2). In a case where the state of the trigger button 135 being pressed is continued (YES in step S21), the control section 150 returns to the determination in step S20, and determines whether or not the next operation information is input from the input operation acquisition unit 110 (step S19).

In a case where the operation information is received (YES in step S20), the control section 150 determines whether or not a touch position of the operation finger is changed on the basis of the input operation information (step S22). In a case where it is determined that there is no change of the touch position (NO in step S22), the control section 150 returns to step S20, and determines whether or not the next operation information is input from the input operation acquisition unit 110 (step S20). In a case where it is determined that the touch position is changed (YES in step S22), the control section 150 determines a direction in which the linearly symmetric axis 350 is set on the basis of a movement direction and a movement distance included in the operation information (step S23). In a case where a movement distance of a touch operation in the x direction on the operation surface 14a is longer than a movement distance in the y direction, the control section 150 sets the linearly symmetric axis 350 in a direction parallel to the X axis of the display region VR. In a case where a movement distance of a touch operation in the y direction on the operation surface 14a is longer than a movement distance in the x direction, the control section 150 sets the linearly symmetric axis 350 in a direction parallel to the Y axis of the display region VR.

In a case where linearly symmetric axis 350 is set, the control section 150 changes display positions of the multi-real pointer 320 and the pseudo-pointer 330 on the basis of the movement direction and the movement distance included in the input operation information (step S24). Specifically, the control section 150 changes a display position of the multi-real pointer 320 in a direction corresponding to a movement direction included in the operation information by a distance corresponding to a movement distance included in the operation information. The control section 150 changes a display position of the pseudo-pointer 330 so that the pseudo-pointer 330 is displayed at a position which is linearly symmetric to the multi-real pointer 320 with respect to the set linearly symmetric axis 350.

Next, the control section 150 determines an input operation from the user on the basis of display positions of the multi-real pointer 320 and the pseudo-pointer 330 after being changed. The control section 150 performs a process corresponding to the determined operation (step S25).

Next, the control section 150 determines whether or not the trigger button 135 is in a pressed state (step S26). In a case where the trigger button 135 is in the pressed state (YES in step S26), the control section 150 returns to step S20, and determines whether or not operation information is input from the input operation acquisition unit 110 (step S20). In a case where the pressed state of the trigger button 135 is canceled (NO in step S26), the control section 150 returns to step S2, and changes an operation mode to the single-touch mode.

Figure 21:
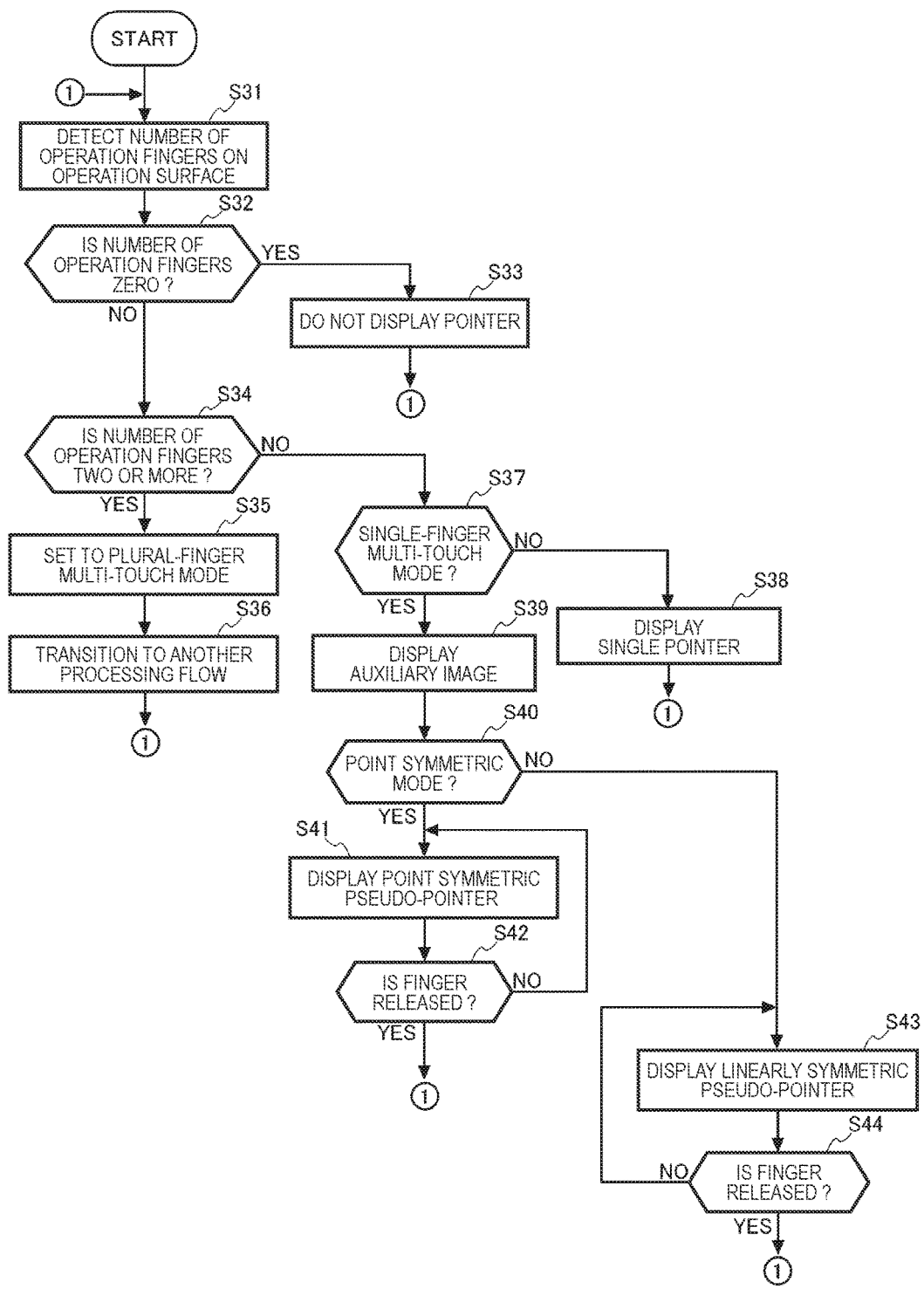
FIG. 21 is a flowchart illustrating an operation of the control section of the HMD.

FIG. 21 is a flowchart illustrating a second operation of the control section 150 of the HMD 100. FIG. 21 illustrates a process flow in a case where a multi-touch operation using a plurality of operation fingers is possible in this operation mode.

First, the control section 150 detects the number of operation fingers touched to the operation surface 14a of the track pad 14 (step S31). In a case where a plurality of operation fingers are simultaneously touched to the operation surface 14a, the input operation acquisition unit 110 outputs coordinate information indicating a plurality of positions in the operation surface 14a to the control section 150 as operation information. Thus, the control section 150 can detect the number of operation fingers touched to the operation surface 14a on the basis of the operation information which is input from the input operation acquisition unit 110.

Next, in a case where the number of detected operation fingers is zero (YES in step S32), the control section 150 causes pointers (the single-real pointer 310, or the multi-real pointer 320, the pseudo-pointer 330, and the base pointer 340) displayed in the display region VR not to be displayed (step S33). In a case where the number of detected operation finger is not zero (NO in step S33) but two or more (YES in step S34), the control section 150 sets an operation mode to the multi-touch mode in which a multi-touch operation using a plurality of detected operation fingers is performed (step S35). The control section 150 proceeds to another process flow in order to perform the multi-touch operation using a plurality of operation fingers (step S36). The control section 150 detects the number of operation fingers touched to the operation surface 14a in parallel to a process for the multi-touch operation (step S31). In a case where the number of operation fingers touched to the operation surface 14a is changed, the control section 150 returns to the flow illustrated in FIG. 21, and performs a process corresponding to the number of detected operation fingers.

In a case where the number of detected operation fingers is not two or more (NO in step S34), the control section 150 determines whether or not to transition to a multi-touch mode in which a multi-touch operation using a single operation finger is performed (step S37). The control section 150 determines whether or not the trigger button 135 is pressed, so as to determine whether or not to transition to the multi-touch mode. In a case where it is determined that transition to the multi-touch mode does not occur (NO in step S37), the control section 150 displays the single-real pointer 310 in the display region VR (step S38). In a case where it is determined that transition to the multi-touch mode occurs (YES in step S37), the control section 150 displays the auxiliary image 360 in the display region VR (step S39).

Next, if the auxiliary image 360 is displayed in the display region VR, the control section 150 determines whether or not a mode selected by the user is the point symmetric mode (step S40). The control section 150 compares information regarding a touch area included in operation information which is input from the input operation acquisition unit 110 with a preset threshold value, so as to determine whether or not the point symmetric mode is selected. In a case where the touch area of the operation finger is more than the threshold value, the control section 150 determines that the point symmetric mode is selected (YES in step S40). In this case, the control section 150 displays the multi-real pointer 320 in the display region VR, and also displays the pseudo-pointer 330 which is point symmetric to the multi-real pointer 320 (step S41). The control section 150 determines whether or not the finger is released from the trigger button 135 (step S42), and pressing of the trigger button 135 is canceled, so as to determine whether or not the multi-touch mode is canceled. In a case where pressing of the trigger button 135 is canceled (YES in step S42), the control section 150 returns to the determination in step S31. In a case where pressing of the trigger button 135 is not canceled (NO in step S42), the control section 150 changes a display position of the multi-real pointer 320 according to the operation information, and also displays the pseudo-pointer 330 at a position which is point symmetric to the multi-real pointer 320 (step S41).

In a case where the touch area of the operation finger is equal to or less than the threshold value, the control section 150 determines that the linearly symmetric mode is selected (NO in step S40). In this case, the control section 150 displays the multi-real pointer 320 in the display region VR, and also displays the pseudo-pointer 330 which is linearly symmetric to the multi-real pointer 320 (step S43). The control section 150 determines whether or not the finger is released from the trigger button 135 (step S44), and pressing of the trigger button 135 is canceled, so as to determine whether or not the multi-touch mode is canceled. In a case where pressing of the trigger button 135 is canceled (YES in step S44), the control section 150 returns to the determination in step S31. In a case where pressing of the trigger button 135 is not canceled (NO in step S44), the control section 150 changes a display position of the multi-real pointer 320 according to the operation information, and also displays the pseudo-pointer 330 at a position which is linearly symmetric to the multi-real pointer 320 (step S43).

As described above, in the present embodiment, the HMD 100 includes the image display section 20, the operation surface 14a of the track pad 14, and the operation unit 115 detecting an operation. The HMD 100 of the present embodiment has the single-touch mode and the multi-touch mode. In the single-touch mode, the single-real pointer 310 which is an operation target is displayed on the image display section 20, and a display position of the single-real pointer 310 is changed according to an operation on the operation surface 14a. In the multi-touch mode, the multi-real pointer 320 and the pseudo-pointer 330 are displayed on the image display section 20, and display positions of the multi-real pointer 320 and the pseudo-pointer 330 are changed according to an operation on the operation surface 14a.

In a case where an operation in a preset aspect is detected by the operation unit 115, the control section 150 switches between the single-touch mode and the multi-touch mode. In the multi-touch mode, in a case where the pseudo-pointer 330 is moved to a corresponding position outside the display region VR of the image display section 20 according to an operation on the operation surface 14a, the control section 150 changes a display aspect of the pseudo-pointer 330.

Therefore, it is possible to switch between the single-touch mode in which a display position of the single-real pointer 310 is changed and the multi-touch mode in which display positions of the multi-real pointer 320 and the pseudo-pointer 330 are changed, and to execute the modes, through an operation on the operation surface 14a.

In a case where the pseudo-pointer 330 is moved to a corresponding position outside the display region VR of the image display section 20, a display aspect of the pseudo-pointer 330 is changed. Thus, the user can recognize that a display position of the pseudo-pointer 330 is deviated from the display region VR. Therefore, the user can return the multi-real pointer 320 and the pseudo-pointer 330 to display positions at which an operation can be performed.

The control section 150 sets the coordinate management region 163 for managing display positions of the multi-real pointer 320 and the pseudo-pointer 330 in the multi-touch mode. The control section 150 changes coordinates indicating display positions of the multi-real pointer 320 and the pseudo-pointer 330 in the coordinate management region 163 on the basis of an operation on the operation surface 14a. A size of the coordinate management region 163 is larger than a size of the display region VR.

Therefore, display positions of the multi-real pointer 320 and the pseudo-pointer 330 can be managed as coordinates on the coordinate management region 163. Since a size of the coordinate management region 163 is larger than a size of the display region VR, even in a case where the multi-real pointer 320 or the pseudo-pointer 330 is located outside the display region VR, a coordinate of this object can be managed.

In a case where an operation mode is changed to the multi-touch mode, the control section 150 displays the auxiliary image 360 indicating an operation position of an operation on the operation surface 14a.

Therefore, it is possible to display the auxiliary image 360 indicating an operation position of an operation on the operation surface 14a in a case where an operation mode is changed to the multi-touch mode. Thus, in the HMD 100 including the image display section 20 mounted on the head of the user, it is possible to improve the operability of an operation on the operation surface 14a.

In a case where an operation position of an operation on the operation surface 14a is located in a preset region of the operation surface 14a, the control section 150 displays the auxiliary image 360.

For example, in a case where an operation position is an end part of the operation surface 14a, the auxiliary image 360 is displayed, and thus it is possible to prevent an operation from being deviated from the operation surface 14a.

The six-axis sensor 235 detects movement of the image display section 20, and the control section 150 determines that an operation in a preset aspect is detected in a case where preset movement of the image display section 20 is detected by the six-axis sensor 235. In this case, the control section 150 changes an operation mode from the single-touch mode to the multi-touch mode.

Therefore, if the user moves the head thereof, movement of the image display section 20 mounted on the head is detected, and thus it is possible to change an operation mode from the single-touch mode to the multi-touch mode.

The HMD 100 includes the camera 61 which captures an image in a range including external scenery visually recognized through the image display section 20. In a case where an image of the control device 10 including the operation surface 14a is included in an image captured by the camera 61, the control section 150 determines that an operation in a preset aspect is detected, and changes an operation mode from the single-touch mode to the multi-touch mode.

Therefore, the operation unit is moved so that the camera 61 captures an image of the control device 10, and thus it is possible to change an operation mode from the single-touch mode to the multi-touch mode.

According to the embodiment of the invention, the operation unit including the operation surface 14a is provided with a button for switching between the single-touch mode and the multi-touch mode, and the control section 150 determines that an operation in a preset aspect is detected in a case where an operation of pressing the button is detected, and changes an operation mode from the single-touch mode to the multi-touch mode.

According to the embodiment of the invention, it is possible to change an operation mode from the single-touch mode to the multi-touch mode on the basis of an operation on the button.

While the pressing operation on the trigger button 135 is continuously detected, the control section 150 sets an operation mode to the multi-touch mode, and changes an operation mode to the single-touch mode in a case where a pressing operation on the button is not detected.

Therefore, an operation mode can be changed to the multi-touch mode by continuously performing a pressing operation on the trigger button 135, and an operation mode can be changed to the single-touch mode by canceling the pressing operation on the button.

In the multi-touch mode, the control section 150 displays the pseudo-pointer 330 at a display position opposite to the multi-real pointer 320 with a set position which is set on the basis of an operation in a preset aspect interposed therebetween.

Therefore, it is possible to operate the multi-real pointer 320 and the pseudo-pointer 330 displayed at opposite positions with the set position interposed therebetween on the basis of an operation on the operation surface 14a. Thus, changes of display positions of the multi-real pointer 320 and the pseudo-pointer 330 are correlated with operations such as rotation, enlargement, reduction, and parallel movement, and thus such operations can be performed through an operation on the operation surface 14a.

In the multi-touch mode, the control section 150 switches between a first aspect in which the pseudo-pointer 330 is displayed at a position which is point symmetric to the multi-real pointer 320 with the set position as the symmetric center, and a second aspect in which the pseudo-pointer 330 is displayed at a position which is linearly symmetric to the multi-real pointer 320 with the set position as a symmetric axis.

Therefore, it is possible to change display positions of the multi-real pointer 320 and the pseudo-pointer 330 displayed at the point symmetric positions or the linearly symmetric positions on the basis of an operation on the operation surface 14a. Thus, changes of display positions of the multi-real pointer 320 and the pseudo-pointer 330 are correlated with operations such as rotation, enlargement, reduction, and parallel movement, and thus such operations can be performed through an operation on the operation surface 14a.

The track pad 14 and the input operation acquisition unit 110 measures a touch area or pressing force on the operation surface 14a in a case where a touch operation on the operation surface 14a is performed. The control section 150 selects one of the first aspect and the second aspect on the basis of at least one of the touch area and the pressing force measured by the detection section. Therefore, it is possible to select the first aspect and the second aspect by changing a touch area or pressing force in a touch operation.

In the multi-touch mode, the control section 150 changes a display position of the multi-real pointer 320 through an operation on the operation surface 14a, and changes a display position of the pseudo-pointer 330 according to the change of the display position of the multi-real pointer 320.

Therefore, a display position of the pseudo-pointer 330 is changed according to a change of a display position of the multi-real pointer 320. Thus, it is also possible to change a display position of the pseudo-pointer 330 by changing a display position of the multi-real pointer 320 through an operation on the operation surface 14a.

In the multi-touch mode, in a case where continuous positions on the operation surface 14a are indicated by a single indicator, the control section 150 changes display positions of the multi-real pointer 320 and the pseudo-pointer 330.

Therefore, it is possible to change display positions of the multi-real pointer 320 and the pseudo-pointer 330 through an operation of a single operation finger.

In the multi-touch mode, the control section 150 performs a process corresponding to changes of display positions of the multi-real pointer 320 and the pseudo-pointer 330.

Therefore, it is possible to perform a process corresponding to changes of display positions of the multi-real pointer 320 and the pseudo-pointer 330 through an operation on the operation surface 14a.

In the above-described embodiment is a preferred embodiment of the invention. However, this is only an example, and various modifications may occur within the scope without departing from the spirit of the invention.

For example, in the above-described embodiment, in a case where a touch area of the operation finger touched to the operation surface 14a is equal to or more than a threshold value, the point symmetric mode is set, and, in a case where the touch area is less than the threshold value, the linearly symmetric mode is set. Conversely, in a case where a touch area of the operation finger touched to the operation surface 14a is equal to or more than a threshold value, the linearly symmetric mode may be set, and, in a case where the touch area is less than the threshold value, the point symmetric mode may be set.

Touch pressure of the operation finger on the operation surface 14a may be compared with a threshold value, and thus switching between the point symmetric mode and the linearly symmetric mode may be performed. For example, in a case where touch pressure is equal to or more than the threshold value, the operation control unit 155 selects the point symmetric mode as an operation mode, and, in a case where the touch pressure is less than the threshold value, the operation control unit 155 selects the linearly symmetric mode as an operation mode. Conversely, the operation control unit 155 may select the linearly symmetric mode in a case where touch pressure is equal to or more than the threshold value, and may select the point symmetric mode in a case where the touch pressure is less than the threshold value.

Switching between the point symmetric mode and the linearly symmetric mode may be performed by operating the operation buttons 11, the up and down keys 15, the switching switch 16, and the like provided in the operation unit 115 as the operators 13. Switching between the point symmetric mode and the linearly symmetric mode may be performed through an operation such as long pressing of the operator 13 or simultaneous operations of a plurality of operators 13.

In the above-described embodiment, an operation mode of the control section 150 is set to the multi-touch mode only while the trigger button 135 is being pressed, but switching between the multi-touch mode and the single-touch mode may be performed according to the number of times of pressing the trigger button 135. For example, in a case where the trigger button 135 is pressed once, the control section 150 selects the single-touch mode, and, in a case where the trigger button 135 is pressed continuously twice, the control section 150 selects the multi-touch mode.

The operation control unit 155 may perform switching between the single-touch mode and the multi-touch mode, and between the point symmetric mode and the linearly symmetric mode on the basis of a direction of the control device 10 detected by the six-axis sensor 123.

For example, in a case where an operation on the operation unit 115 such as the trigger button 135 is received when a direction of the control device 10 is a first direction (for example, a vertical direction), the operation control unit 155 performs switching between the single-touch mode and the multi-touch mode. In a case where an operation on the operation unit 115 such as the trigger button 135 is received when a direction of the control device 10 is a second direction (for example, a horizontal direction), the operation control unit 155 performs switching between the point symmetric mode and the linearly symmetric mode. An operation on the operation unit 115 may be movement of the head (nodding or shaking) detected by the six-axis sensor 235 mounted on the image display section 20.

In the above-described embodiment, an operation mode is changed between the single-touch mode and the multi-touch mode through an operation on the trigger button 135, but an operation mode may be changed by using an image captured by the camera 61. For example, in a case where an image of the control device 10 is captured by the camera 61, the operation control unit 155 may change an operation mode from the single-touch mode to the multi-touch mode, and, in a case where an image of the control device 10 is not captured by the camera 61, the operation control unit 155 may change an operation mode from the multi-touch mode to the single-touch mode.

An operation mode of the operation control unit 155 may be changed on the basis of a detection value from the six-axis sensor 235 mounted on the image display section 20. For example, in a case where nodding (vertical motion of the head) of the head of the user is detected on the basis of a detection value from the six-axis sensor 235, the operation control unit 155 changes an operation mode to the multi-touch mode, and, in a case where shaking (horizontal motion of the head) of the head is detected, the operation control unit 155 changes an operation mode to the single-touch mode.

In a case where an image of the control device 10 is included in an image captured by the camera 61, and then a preset trigger is detected, the operation control unit 155 may change an operation mode from the single-touch mode to the multi-touch mode. The preset trigger may be an operation of pressing the trigger button 135, and may be an operation on the operator 13 of the operation unit 115. The preset trigger may be a nodding or shaking action of the head of the user detected on the basis of a detection value from the six-axis sensor 235.

FIGS. 7 to 14 illustrate circular images as images indicating the multi-real pointer 320, the pseudo-pointer 330, and the base pointer 340, but images of such pointers may be images having other shapes. For example, circular images may be displayed in a state in which the multi-real pointer 320 and the pseudo-pointer 330 stand still, and arrow images indicating movement directions of the pointers may be displayed in a case where display positions thereof are changed through a touch operation.

FIGS. 7 to 14 illustrate images having the same shape as images indicating the multi-real pointer 320, the pseudo-pointer 330, and the base pointer 340, but images indicating such pointers may be images having different shapes.

In the above-described embodiment, a description has been made of a case where display positions of the multi-real pointer 320 and the pseudo-pointer 330 are changed through a touch operation using a single operation finger, but the number of operation fingers is not limited to one, and may be two or more. For example, the index finger and the middle, or the index finger, the middle finger, and the ring finger may be touched, and an operation may be performed with the fingers as a single operation finger.

The HMD 100 may include an interface (not illustrated) for connection to various external apparatuses which are supply sources of content. The interface may be, for example, an interface capable of coping with wired connection, such as a USB interface, a micro USB interface, a memory card interface, and may be a wireless communication interface. External apparatuses in this case are image supply apparatuses supplying images to the HMD 100, and may be a personal computer (PC), a mobile phone terminal, a portable game machine, and the like. In this case, the HMD 100 may output images or voices based on the content data 162 which is input from such an external apparatus.

In the above-described embodiment, a description has been made of an exemplary configuration in which the control device 10 and the image display section 20 are connected to each other in a wired manner, but the control device 10 and the image display section 20 may be connected to each other in a wireless manner. A wireless communication method in this case may employ methods which are exemplified by the communication unit 126 as communication methods, and may be other communication methods.

Some functions of the control device 10 may be installed in the image display section 20, and the control device 10 may be implemented by a plurality of devices. In other words, the control device 10 is not limited to a configuration of including the box-shaped case 10A. For example, instead of the control device 10, a wearable device which is attachable to the user's body, clothes, or an ornament worn by the user. The wearable device in this case may be, for example, a watch type device, a ring type device, a laser pointer, a mouse, an air mouse, a game controller, and a pen type device.

In the above-described embodiment, a description has been made of an exemplary configuration in which the image display section 20 and the control device 10 are separated from each other, and are connected to each other via the connection cable 40. The invention is not limited thereto, and there may be a configuration in which the control device 10 and the image display section 20 are integrally formed, and are mounted on the head of the user.

A notebook computer, a tablet computer, or a desktop computer may be used as the control device 10. Portable electronic devices including a game machine, a mobile phone, a smart phone, or a portable media player, and other dedicated devices may be used as the control device 10.

For example, instead of the image display section 20, image display sections of other types such as an image display section worn like a cap may be used, and the image display section may include a display unit displaying an image so as to correspond to the left eye LE of the user and a display unit displaying an image so as to correspond to the right eye RE of the user. A head-up display may be used instead of the image display section 20 so as to be able to be mounted in vehicles such as an automobile or an airplane. For example, in a case where a head-up display is mounted in a vehicle, an operation surface corresponding to the operation surface 14a of the track pad 14 is provided on a steering wheel of the vehicle.

For example, the HMD 100 may be configured as a head mounted display built into a body protection tool such as a helmet. In this case, the head mounted display may be provided with a portion determining a position relative to the user's body, and a portion whose position is determined relative to the portion, as a mounting unit.

As an optical system guiding image light to the eyes of the user, a description has been made of an exemplary configuration in which virtual images are formed on parts of the right light guide plate 26 and the left light guide plate 28 by the half mirrors 261 and 281. The invention is not limited thereto, and images may be displayed in display regions having areas occupying the whole of the right light guide plate 26 and the left light guide plate 28 or most thereof. In this case, an operation of changing a display position of an image may include a process of reducing the image.

Optical elements of the embodiment of the invention are not limited to the right light guide plate 26 and the left light guide plate 28 having the half mirrors 261 and 281, and may be optical components which cause image light to be incident to the eyes of the user, and may be, specifically, a diffraction grating, a prism, and a holography display unit.

At least some of the respective functional blocks illustrated in FIGS. 4 and 5 may be realized by hardware, may be realized through cooperation between hardware and software, and are not limited to the configuration in which separate hardware resources are disposed as illustrated in the figures. A program executed by the control section 150 may be stored in the nonvolatile storage unit 121 or other storage devices (not illustrated) of the control device 10. There may be a configuration in which a program stored in an external device is acquired via the communication unit 126 or the external connector 184 so as to be executed. Among the constituent elements provided in the control device 10, the operation unit 115 may be used as a user interface (UI).

The processing units of the flowcharts illustrated in FIGS. 18 to 20 are made separate according to the principal processing content for better understanding of processes in the control section 150 of the HMD 100, and the invention is not limited due to a method of separating the processing unit or a name thereof. The processes in the control section 150 may be divided into more processing units according to the processing content, and a single processing unit may be divided into processing units so as to include more processes. The processing order in the flowchart is not limited to the illustrated example.

The entire disclosure of Japanese Patent Application No. 2017-015488, filed Jan. 31, 2017 is expressly incorporated by reference herein.

What is claimed is:

1. A head mounted display comprising:
   a head mounted type display section that is mounted on the head of a user;
   an operation unit that is provided with an operation surface;
   a detection section that detects an operation; and
   a control section that is configured to execute a single-operation mode in which a first object which is an operation target is displayed on the display section, and a display position of the first object is changed according to an operation on the operation surface, and a multi-operation mode in which the first object and a second object are displayed on the display section, and display positions of the first object and the second object are changed according to an operation on the operation surface, and switches between the single-operation mode and the multi-operation mode in a case where an operation in a preset aspect is detected by the detection section, wherein, in the multi-operation mode, in a case where the second object is moved to a corresponding position outside a display region of the display section according to an operation on the operation surface, the control section changes a display aspect of the second object.

2. The head mounted display according to claim 1, wherein, in the multi-operation mode, the control section sets a coordinate management region for managing display positions of the first object and the second object, and changes coordinates indicating display positions of the first object and the second object in the coordinate management region according to an operation on the operation surface, and wherein the coordinate management region has a size larger than a size of the display region.

3. The head mounted display according to claim 1, wherein, in a case where an operation mode is changed to the multi-operation mode, the control section displays an auxiliary image indicating an operation position of an operation on the operation surface.

4. The head mounted display according to claim 3, wherein, in a case where the operation position of an operation on the operation surface is located in a preset region of the operation surface, the control section displays the auxiliary image.

5. The head mounted display according to claim 1, wherein the detection section detects movement of the display section, and wherein, in a case where preset movement of the display section is detected by the detection section, the control section determines that an operation in a preset aspect is detected, and changes an operation mode from the single-operation mode to the multi-operation mode.

6. The head mounted display according to claim 1, further comprising:
an imaging section that captures an image in a range including external scenery visually recognized through the display section,
wherein, in a case where an image of the operation unit provided with the operation surface is included in an image captured by the imaging section, the control section determines that an operation in a preset aspect is detected, and changes an operation mode from the single-operation mode to the multi-operation mode.

7. The head mounted display according to claim 1, wherein the operation unit includes a button for switching between the single-operation mode and the multi-operation mode, and
wherein, in a case where a pressing operation on the button is detected, the control section determines that an operation in a preset aspect is detected, and changes an operation mode from the single-operation mode to the multi-operation mode.

8. The head mounted display according to claim 7, wherein the control section sets an operation mode to the multi-operation mode while the pressing operation on the button is continuously detected, and changes an operation mode to the single-operation mode in a case where the pressing operation on the button is not detected.

9. The head mounted display according to claim 1, wherein, in the multi-operation mode, the control section displays the second object at a display position opposite to the first object with a set position which is set on the basis of an operation in a preset aspect interposed therebetween.

10. The head mounted display according to claim 9, wherein, in the multi-operation mode, the control section switches between a first aspect in which the second object is displayed at a position which is point symmetric to the first object with the set position as the symmetric center, and a second aspect in which the second object is displayed at a position which is linearly symmetric to the first object with the set position as a symmetric axis.

11. The head mounted display according to claim 10, wherein the detection section measures a touch area or pressing force on the operation surface in a case where a touch operation on the operation surface is performed, and
wherein the control section selects one of the first aspect and the second aspect on the basis of at least one of the touch area and the pressing force measured by the detection section.

12. The head mounted display according to claim 1, wherein, in the multi-operation mode, the control section changes a display position of the first object according to an operation on the operation surface, and changes a display position of the second object according to a change of the display position of the first object.

13. The head mounted display according to claim 1, wherein, in the multi-operation mode, in a case where continuous positions on the operation surface are indicated by a single indicator, the control section changes display positions of the first object and the second object.

14. The head mounted display according to claim 1, wherein, in the multi-operation mode, the control section performs a process corresponding to changes of display positions of the first object and the second object.

15. A control method for a head mounted display including a head mounted type display section mounted on the head of a user, an operation unit provided with an operation surface, and a detection section detecting an operation, the method comprising:
executing a single-operation mode in which a first object which is an operation target is displayed on the display section, and a display position of the first object is changed according to an operation on the operation surface, and a multi-operation mode in which the first object and a second object are displayed on the display section, and display positions of the first object and the second object are changed according to an operation on the operation surface, and switching between the single-operation mode and the multi-operation mode in a case where an operation in a preset aspect is detected by the detection section; and
erasing display of the second object from a display region, in the multi-operation mode, in a case where the second object is moved to a corresponding position outside the display region of the display section according to an operation on the operation surface.

* * * * *